US010942752B2

(12) United States Patent
Hawkett

(10) Patent No.: US 10,942,752 B2
(45) Date of Patent: Mar. 9, 2021

(54) CLOUD COMPUTING OPERATING SYSTEM AND METHOD

(71) Applicant: DISOS PTY LTD., Fitzroy (AU)

(72) Inventor: Colin James Hawkett, Melbourne (AU)

(73) Assignee: DISOS PTY LTD., Victoria (AU)

(*) Notice: Subject to any disclaimer, the term of this patent is extended or adjusted under 35 U.S.C. 154(b) by 519 days.

(21) Appl. No.: 15/375,840

(22) Filed: Dec. 12, 2016

(65) Prior Publication Data
US 2017/0153900 A1 Jun. 1, 2017

Related U.S. Application Data

(62) Division of application No. 13/638,867, filed as application No. PCT/GB2011/050652 on Mar. 30, 2011, now Pat. No. 9,547,676.

(60) Provisional application No. 61/319,083, filed on Mar. 30, 2010.

(51) Int. Cl.
G06F 17/00 (2019.01)
G06F 9/445 (2018.01)
G06F 16/22 (2019.01)
G06F 9/50 (2006.01)
G06Q 20/22 (2012.01)
H04L 29/06 (2006.01)

(52) U.S. Cl.
CPC .......... *G06F 9/445* (2013.01); *G06F 9/5072* (2013.01); *G06F 16/22* (2019.01); *G06Q 20/22* (2013.01); *H04L 63/10* (2013.01)

(58) Field of Classification Search
CPC ........ G06F 9/445; G06F 16/22; G06F 9/5072; G06Q 20/22; H04L 63/10
See application file for complete search history.

(56) References Cited

U.S. PATENT DOCUMENTS

| 5,875,446 A | 2/1999 | Brown et al. | |
| 2003/0105810 A1* | 6/2003 | McCrory | ................ H04L 29/06 709/203 |
| 2004/0103416 A1* | 5/2004 | Orton | ........................ G06F 8/76 719/328 |
| 2004/0122926 A1 | 6/2004 | Moore et al. | |

(Continued)

OTHER PUBLICATIONS

International Search Report for Int'l Application No. PCT/GB2011/050652, six pages, dated Feb. 13, 2012.

(Continued)

*Primary Examiner* — Tyler J Torgrimson
(74) *Attorney, Agent, or Firm* — Nixon & Vanderhye, P.C.

(57) ABSTRACT

A cloud computing operating system is described. The system, in one aspect, includes a plurality of code encapsulating data structures each configured to define executable code and to define the structure of one or more encapsulating data structures. The executable code is configured to instantiate one or more of the encapsulating data structures and to perform runtime operations on the encapsulating data structures. And the plurality of code encapsulating data structures form an inheritance hierarchy, each code encapsulating data structure being an encapsulating data structure itself and each encapsulating data structure instantiated by an associated code encapsulating data structure. Other aspects of the cloud computing operating system are also described.

13 Claims, 26 Drawing Sheets

(56) References Cited

U.S. PATENT DOCUMENTS

| | | | |
|---|---|---|---|
| 2005/0044301 A1 | 2/2005 | Vasilevsky et al. | |
| 2005/0209984 A1* | 9/2005 | Brown | G06F 9/465 |
| 2005/0246762 A1 | 11/2005 | Girouard et al. | |
| 2009/0089291 A1 | 4/2009 | Daily et al. | |
| 2011/0072055 A1 | 3/2011 | Swaminathan et al. | |
| 2011/0126168 A1* | 5/2011 | Ilyayev | G06F 9/5072 |
| | | | 717/103 |

OTHER PUBLICATIONS

International Preliminary Report on Patentability for Int'l Application No. PCT/GB2011/050652, one page, dated Oct. 2, 2012.
Written Opinion for Int'l Application No. PCT/GB2011/050652, nine pages, dated Feb. 13, 2012.

* cited by examiner

CLOUD COMPUTING OPERATING SYSTEM AND METHOD

This application is a divisional of application Ser. No. 13/638,867, filed Dec. 12, 2012, now allowed; which is the U.S. national phase of International Application No. PCT/GB2011/050652 filed Mar. 30, 2011 which designated the U.S. and claims priority to U.S. Provisional Application No. 61/319,083, filed Mar. 30, 2010, the entire contents of each of which are hereby incorporated by reference.

FIELD OF THE INVENTION

The present invention relates to a cloud computing operating system for execution within a cloud computing environment and, preferably, which provides a platform for large-scale development and deployment of resources, such as cloud-based applications, and for management of users of the resources.

BACKGROUND

Any discussion of the prior art throughout the specification should in no way be considered as an admission that such prior art is widely known or forms part of common general knowledge in the field.

In the last few years, the software services industry has seen a shift in product delivery from desktop applications to complex online applications accessed through a web browser. This capability is enabled through advancements in networking capacity, improvements in web browser technology as well as the availability of remotely accessible, commodity, aggregated computer hardware resources known as 'cloud computing'. From a technological perspective, these aggregated resources present virtually as a single massive computing entity. This capability has enabled single applications to scale to huge numbers of concurrent users—many millions being common.

There remains the issue, however that users interact directly with applications hosted directly on the virtualised hardware. Application experience varies wildly: each may require separate logins, while data incompatibility and application vendor lock-in are commonplace. From a cloud perspective these issues arise partly because, from a virtual perspective, the applications run directly on the hardware—there is no user operating system layer to deliver a consistent experience across the applications. Consequently, a cloud operating system is desired which can deliver a coherent user experience, and significantly increased application compatibility in the web application domain.

Also recently, there has been a growing focus in capabilities that may be afforded by 'crowdsourcing'—leveraging the capabilities of the mass of connected individuals afforded by the web to achieve large outcomes in a short time. The problem of application silos previously described represents a barrier to realising the greater potential of these mechanisms. The free interaction of users and applications that could be afforded by the common substrate of an operating system is not present. Consequently, the delivery of a cloud operating system upon which users are able to self-organise into groups arbitrarily, build and deploy applications, as well as being able to actively maintain and evolve the system via these structures would represent a significant opportunity for advancement of the power of the world wide web. An operating system offers a means of organising its users, and a cloud operating system would have the unique opportunity to utilise the scale of its potential user base for the significantly more complex scenarios being exposed through crowdsourcing.

There has also been a recent focus on social reward and reputation structures within applications to incentivise behaviour and establish trust networks. The potential for such structures, once the artificial boundaries of application and user silos are removed, and once complex collaboration capabilities are delivered is tremendous. In combination, these structures may represent a truly significant advance in the organisational utility of the web.

SUMMARY

It is an object of the present invention to provide an improved method and system for interacting with a cloud computing environment.

In accordance with a first aspect of the present invention, there is provided a cloud computing operating system including a plurality of core data structures each configured to define basic attributes that elements of the system contain.

Each core data structure may be configured to aggregate core data structures, or elements inherited from core data structures.

The core data structures may be Knowts as described herein.

Every core data structure may be owned by a group. The group may be the Group described herein.

The system also includes an indexing data structure inherited from one of the core data structures configured to index any number of core data structures or elements inherited from a core data structure.

Each core data structure may be indexed within zero or more indexing data structures.

The indexing data structure may be a Context as described herein.

The system also includes an encapsulating data structure inherited from the indexing data structure and configured to encapsulate any number of core data structures or elements inherited from a core data structure. The encapsulating data structure may be a Scope as described herein.

Each core data structure is encapsulated within one encapsulating data structure and includes a reference to its encapsulating data structure.

Each core data structure, or element inherited from a core data structure, may be associated with a reputation. Each reputation may be increased or decreased by an action of a user.

The reputation of the core data structures, or elements inherited from a core data structure, may influence the reputation of parent and/or child elements within a hierarchy of the core data structure/element. The hierarchy may include elements that are aggregated, indexed, encapsulated or owned.

The core data structures, and elements inherited from a core data structure, may include a version identifier. Some of these core data structures, and elements inherited from a core data structure, may include executable code configured to migrate data between different versions of the core data structures or elements.

The cloud computing operating system may be implemented in software executing on a virtual cloud computing platform. The virtual platform may be executing on a distributed network of computing resources including processors, primary memory, and secondary memory.

The structures of the cloud computing operating system may be configured to provide applications or components.

Users or other web applications may access applications or components within the cloud computing operating system through a network interface.

Potential advantages of this aspect of the present invention include: the inherited nature of the structures of the cloud computing operating system provides for faster loading of applications or components of the operating system and, due to the inherited nature of the structures, less space in primary and secondary memory is utilised.

In accordance with a further aspect of the present invention, there is provided a cloud computing operating system which includes a plurality of code encapsulating data structures each configured to define executable code and to define the structure of one or more encapsulating data structures.

The encapsulating data structures may be a Scope as described herein, and the code encapsulating data structures may be a Process as described herein.

The executable code is configured to instantiate the one or more encapsulating data structures and to perform runtime operations on the one or more encapsulating data structures.

The plurality of code encapsulating data structures form an inheritance hierarchy, in that there is a root code encapsulating data structure and all further code encapsulating data structures ultimately inherit from that root. The root code encapsulating data structure may be the Kernel Process as described herein. The system may include additional code encapsulating data structures formed into another inheritance hierarchy—for example, where there is another version of the root code encapsulating data structure (such as another Kernel Process).

Each code encapsulating data structure is an encapsulating data structure itself and each encapsulating data structure is instantiated by an associated code encapsulating data structure. The code encapsulating data structure itself may be instantiated by the Process Process as described herein. The code encapsulating data structure may be inherited from an encapsulating data structure.

Each code encapsulating data structure may provide a network accessible interface to the executable code, such as a RESTful API. The RESTful API may comprise a unique first identifier to an element of the cloud computing operating system. This first identifier may encode a unique second identifier for an encapsulating data structure. This second identifier may encode a unique third identifier for the code encapsulated data structure which instantiated the encapsulating data structure. The RESTful API may further comprise an action identifier such as get, delete, post, and put. The RESTful API may also comprise a collection identifier identifying an aggregated, indexed, encapsulated, or owned data structure.

The encapsulating data structure may be instantiated by the associated code encapsulating data structure by instantiation of each code encapsulating data structure in sequence from the root code encapsulating data structure down the inheritance hierarchy of the associated code encapsulating data structures.

All encapsulating data structures may access a database only through the root of the inheritance hierarchy.

Preferably, all encapsulating data structures are instantiated by one and only one code encapsulating data structure. To clarify, the instantiation process using the one and only one code encapsulating data structure may utilise all the code encapsulating data structures within said structure's inheritance chain to instantiate the encapsulating data structure.

The executable code within the code encapsulating data structures may be further configured to define user interface elements.

The cloud computing operating system may be implemented in software executing on a virtual cloud computing platform. The virtual platform, such as Google App Engine, may be executing on a distributed network of computing resources including processors, primary memory, and secondary memory. The virtual platform may provide access to the secondary memory through a cloud database abstraction, such as Google BigTable.

The code encapsulating data structures may be configured to provide applications, such as web applications, or components, such as data processing components.

Users or other web applications may access applications or components within the cloud computing operating system through the network accessible interface.

Potential advantages of this aspect of the present invention include: faster loading and more efficient storage of applications or components of the cloud computing operating system, persistence of application or component data while minimising processor and primary memory usage, generalised interface access through a network accessible interface, and a distributed operating system architecture. Another potential advantage of this aspect of the present invention is that new code encapsulating data structures (or processes) can obtain everything from the processes they inherit from and, therefore, this minimises development requirements for inherited components.

In accordance with a further aspect of the present invention, there is provided a cloud computing operating system that includes a request processor configured to receive a request relating to a specific core data structure of an instance of an encapsulating data structure and configured to load an invoker module from a predefined code encapsulating data structure.

The predefined code encapsulating data structure may be a Kernel Process as described herein.

The core data structure may be a Knowt, the encapsulating data structure may be a Scope, and the code encapsulating data structure may be a Process, all as described herein. The core data structures may include all elements inherited from the core data structures such as encapsulating data structures, code encapsulating data structures, and indexing data structures.

An invoker module is also provided which is configured to action the received request on the specific core data structure via a code encapsulating data structure that instantiated the encapsulating data structure.

The received request may be actioned on the specific core data structure via a Code Knowt as described herein.

The request may relate to more than one specific core data structure.

The code encapsulating data structure may be in turn instantiated by a parent code encapsulating data structure, and the request may be actioned by the code encapsulating data structure via its parent. The parent code encapsulating data structure may be a Process Process as described herein.

The parent code encapsulating data structure may include a resource locator configured to define a parsing and execution method for requests. The parent code encapsulating data structure may be Process Process as described herein.

Each code encapsulating data structure may form an inheritance chain and each code encapsulating data structure within the inheritance chain may be instantiated by its own parent code encapsulating data structure. Each parent code encapsulating data structure may define a resource locator, and the invoker module may select the parent code encapsulating data structure based on resolution of the request to a code encapsulating data structure within the inheritance chain.

The cloud computing operating system may be implemented in software executing on a virtual cloud computing platform. The virtual platform may be executing on a distributed network of computing resources including processors, primary memory, and secondary memory.

The code encapsulating data structures may be configured to provide applications, such as web applications, or components, such as data processing components.

Potential advantages of this aspect of the present invention include: the use of the instantiating code encapsulating data structure for actioning the request enables primary memory caching of code for use with multiple instantiated encapsulating data structures improving request processing speed.

In accordance with a further aspect of the present invention, there is provided a cloud computing operating system that includes a plurality of groups and plurality of users. Each user owns at least one group, at least some of the users are members of multiple groups, each group assigns each member at least one role selected from a plurality of roles, the roles form at least one hierarchy within the group, and each member represents a subset of information of its corresponding user.

The group, user, member, and role described above may be the specific Group, Persona, Member, and Role described herein.

The group owned by a user may be created by the system when the user first authenticates with the system.

The plurality of groups form a hierarchy. The root of the hierarchy may be the Root Group described herein.

Roles within a group may be associated with one or more invitation mechanisms. The invitation mechanism may include criteria for users for becoming a member of the group with that role.

Each role may determine the level of access for members to resources owned by the group. The resources may be structures of the cloud computing operating system. Such structures may provide applications or components for use by members. The resources may be encapsulated within an encapsulating data structure, and the encapsulating data structure may define the level of access for each role to each encapsulated resource.

The structures may be code encapsulating data structures such as Processes described herein.

The cloud computing operating system may be implemented in software executing on a virtual cloud computing platform. The virtual platform may be executing on a distributed network of computing resources including processors, primary memory, and secondary memory.

Potential advantages of this aspect of the present invention include: improved speed of fine-grained access to users of applications or components by using role defined access within groups of which users are members and/or role defined access within the structures that provide the applications or components, segregation of user data across groups improving data security and the provision of these capabilities to developers of applications for the system.

In accordance with a further aspect of the present invention, there is provided a cloud computing operating system that includes an interface module configured to provide access to modules of the cloud computing operating system by parsing requests using polymorphic matching, wherein the requests are made using an internet protocol.

The internet protocol may be HTTP.

The modules may be core data structures such as Knowts described herein. The modules may form an inheritance chain.

The cloud computing operating system may be implemented in software executing on a virtual cloud computing platform. The virtual platform may be executing on a distributed network of computing resources including processors, primary memory, and secondary memory.

Potential advantages of this aspect of the present invention include: enablement of a distributed computing hardware architecture by use of an internet protocol to provide access to modules of the operating system, and improved speed and memory usage by use of polymorphic matching to execute code throughout a module's inheritance chain.

In accordance with a further aspect of the present invention, there is provided a cloud computing operating system that includes an interface configured to parse a received uniform resource identifier (URI) and associated operation to extract a structured representation mapping to an inheritance hierarchy related to the identified resource.

The interface may be configured to generate a plurality of possible representations from the inheritance hierarchy using the structured representation.

The interface may be further configured to authorise the URI request by matching the request to a URI pattern. In such case, a match is defined by the URI pattern matching any one of a plurality of possible representations.

The interface may be further configured to identify manifestations of representations from the plurality of possible representations. Representations may be manifested by the existence of executable code corresponding to the representation.

The interface may be further configured to execute the code on the resource or to arrange execution of the code on the resource. The code may be executed on the resource in accordance with the received operation.

The manifestation of the representation may be associated with an achievement generating module. Preferably the request also includes an identifier of a user—for example, a HTTP request parameter, a header or a cookie—and the achievement generating module may generate an achievement for that user. The achievement generation module may be configured to record or observe progress towards an achievement and to generate an achievement related to the resource for said member when a defined threshold is met.

The identified resource may be an instance of a core data structure or element inherited from a core data structure, such as a Knowt or element inherited from a Knowt as herein described.

The identified resource may be associated with a type name that identifies that core data structure and its position in an inheritance chain.

The structured representation mapping to an inheritance hierarchy related to the identified resource may represent an execution sequence in correspondence to the inheritance chain of the identified core data structure. Execution of code existing in relation to each of said manifestations occurs according to the execution sequence, specifically, in that the execution sequence starts with code existing at the identified manifestation associated with the core data structure whose position in the inheritance chain is the furthest from the core data structure and ends with code existing at the manifestation associated with the core data structure at the root of the inheritance chain.

The URI may specify a collection of resources associated with the identified resource. The collection may be identified by the type name that identifies the core data structure within the URI. The execution sequence may be derived from both the identified resource and the specified collection.

The cloud computing operating system may be implemented in software executing on a virtual cloud computing platform. The virtual platform may be executing on a distributed network of computing resources including processors, primary memory, and secondary memory.

Potential advantages of this aspect of the present invention include: enablement of a distributed computing hardware architecture by use of a uniform resource identifier to identify resources, and improved speed and memory usage by use of structure representation mapped within an inheritance hierarchy related to the resource.

In accordance with a further aspect of the present invention, there is provided a cloud computing operating system that includes development of applications and deployment of said applications within the same environment. Each application includes multiple versions, and a new version of an application is deployed by locking that version of the application from further development.

The cloud computing operating system may be implemented in software executing on a virtual cloud computing platform. The virtual platform may be executing on a distributed network of computing resources including processors, primary memory, and secondary memory.

Potential advantages of this aspect of the present invention include: simplified hardware infrastructure requirements due to use of the same infrastructure for development and deployment.

In accordance with a further aspect of the present invention, there is provided a method for charging for application instance use within a cloud computing operating system. The method includes the step of allocating charges to a using group. The using group is a group of the cloud computing operating system that provides access to application instances to members of the using group.

The application instance may be an instance of a code encapsulating data structure such as the Processes described herein.

Charges allocated to the group may be distributed within the using group to its members. The charges may be distributed to the group's members based on the role of the member within the group. Charges for the application instance use may include charges based on: resources consumed by the application instance by the using group, the number of members in the using group, and/or the number of application instances used by the using group.

Some of the charges may be configured to be paid by a parent group of the using group.

The method may be implemented in software, and may be implemented within the cloud computing operating system itself.

The cloud computing operating system may be implemented in software executing on a virtual cloud computing platform. The virtual platform may be executing on a distributed network of computing resources including processors, primary memory, and secondary memory.

Potential advantages of this aspect of the present invention include: by utilising group membership to provide for charging of application use, fine-grain charging is obtained using a simpler hardware infrastructure and reduced hardware resource usage.

In accordance with a further aspect of the present invention, there is provided a method for allocating payment within a cloud computing operating system. Payment for use of an application instance of the cloud computing operating system within the method is allocated based on an inheritance chain of the corresponding application.

Each the components within the inheritance chain of the application may be owned by one of the plurality of groups of the cloud computing operating system, and payment may be allocated to each of these groups.

Payment may be allocated in accordance with a payment method defined for the particular component by each owning group.

Some components may be code encapsulating data structures such as Processes described herein.

Each application instance may be owned by a group, and each application instance may result in charges allocated to the group which owns the application.

The method may be implemented in software, and may be implemented within the cloud computing operating system itself.

The cloud computing operating system may be implemented in software executing on a virtual cloud computing platform. The virtual platform may be executing on a distributed network of computing resources including processors, primary memory, and secondary memory.

Potential advantages of this aspect of the present invention include: by utilising application inheritance to provide for allocating payments for application use, individual component use charging is obtained using a simpler hardware infrastructure and reduced hardware resource usage.

In accordance with a further aspect of the present invention, there is provided a method for providing access to applications through a plurality of marketplaces within a cloud computing operating system. The method includes the step of each marketplace providing access to one or more applications. Each marketplace defines its own marketplace fees and some of the applications are available from within more than one marketplace.

Each application may be a code encapsulating data structure such as a Process as described herein.

Each marketplace may be owned by a group.

The method may include the steps of a group purchasing an application from one of the marketplaces, instantiating said application as an application instance; and providing access to the application instance to the members of the group. The purchase may be a one-off charge or a subscription charge.

Each application may be owned by a group. The price may be, at least partially, set by the owning group for each application.

The method may be implemented in software, and may be implemented within the cloud computing operating system itself.

The cloud computing operating system may be implemented in software executing on a virtual cloud computing platform. The virtual platform may be executing on a distributed network of computing resources including processors, primary memory, and secondary memory.

Potential advantages of this aspect of the present invention include: use of a single cloud computing operating system enables the provision of the same applications within different marketplaces without requiring multiple hardware infrastructures to support multiple platforms, and the use of a single deployment environment for multiple marketplaces also results in the need to develop only a single version of the application instead of developing application versions for each platform.

In accordance with a further aspect of the present invention, there is provided a method of authorising a uniform resource identifier (URI) request. The method includes the step of authorising the request when a role of a user associated with the request matches an authorisation level mapped to the role and that authorisation level is mapped to an URI pattern which matches the URI request. The roles are mapped to authorisation levels within an encapsulating data structure and authorisation levels are mapped to URI patterns.

Each role may be a role within a group.

The encapsulating data structure may be a Scope as described herein.

The URI pattern may be a regex pattern and may include a HTTP request method.

The method may be implemented in software, and may be implemented within the cloud computing operating system itself.

The cloud computing operating system may be implemented in software executing on a virtual cloud computing platform. The virtual platform may be executing on a distributed network of computing resources including processors, primary memory, and secondary memory.

Potential advantages of this aspect of the present invention include: faster hardware response times for fine-grained authorisation of user access to particular application functionality due to matching a URI pattern of the authorisation to the URI request from the user.

Other aspects and features of the above aspects are described within the appended claims.

It will be apparent that some of the potential advantages listed for an aspect may also be applicable for other aspects.

BRIEF DESCRIPTION OF THE DRAWINGS

Benefits and advantages of the present invention will become apparent to those skilled in the art to which this invention relates from the subsequent description of exemplary embodiments and the appended claims, taken in conjunction with the accompanying drawings, in which:

DETAILED DESCRIPTION

Figure 1:
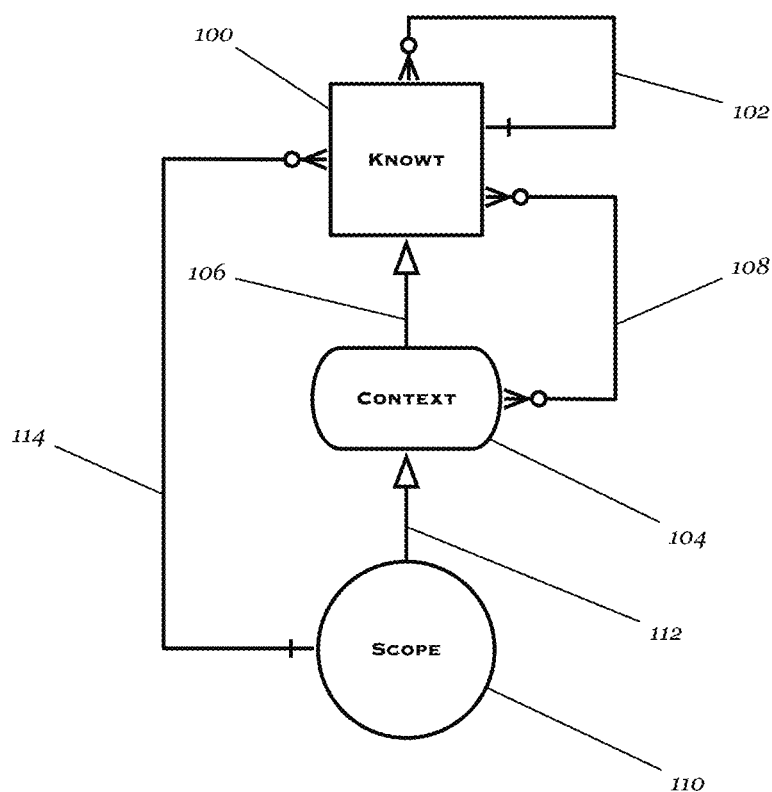
FIG. 1 illustrates the primary Scope (circle), Context (capsule) & Knowt (square) data structures.

Preferred embodiments of the invention will now be described, by way of example only, with reference to the accompanying drawings. The preferred embodiment provides for an "operating system" for a cloud computing environment which operates via the Internet. The environment provides an operating system like environment with some similarities to that provided by well-known operating systems such as UNIX or Microsoft Windows™ or the like.

The system of the preferred embodiment is described for deployment to a cloud computing platform capable of handling requests conforming to the HTTP protocol, however any protocol capable of handling resource oriented requests would suffice, and indeed the system could support multiple protocols concurrently.

The system is described for deployment to Google App Engine™, however other platforms such as Amazon Web Services™ or Microsoft Azure™ could be utilised. The system described details the structures underlying the mechanism by which a server implementation is realized. It is important to recognize that any number of specific server implementations may manifest using these structures, and that these are intended to change dynamically at runtime. The system is thereby capable of changing its own behaviour and definition.

The system is described for provision of a HTTP system interface capable of conforming to the Representational State Transfer (REST) architectural constraints. While the REST specification itself is quite strict, it is somewhat ambiguous, and the term 'RESTful' has entered common parlance to mean a resource oriented data interface that may or may not conform entirely to all the REST architectural constraints. As such, the description uses the term 'RESTful' to mean a resource oriented system interface, and does not claim to describe a system interface that is 100% conformant to the original REST specification.

The system is realized and described through iterative application of a series of concepts hereinafter called "iterations". The following text describes the sequence of iterations that deliver the system. The names of all data structures and fields are arbitrary. The following list summarises the elements defined in each subsequent iteration:

Knowt—the primary data structure of the system

Context—an indexing structure extending Knowt

Scope—an encapsulation structure extending Context

Process—a Scope for storing Model definitions, server code, RESTful interface definitions and user interface for operating on specific Scope types.

Process instantiation—creating Scopes managed by Processes

Process Process—the Process which manages Process Scopes

Process inheritance—the means by which a Process extends the behaviour of another Process Request Handling—the means by which RESTful applications requests are serviced by the system RESTful URI—the structure of a RESTful URI, and the means by which the URI are used to invoke code within the system Scope Snapshot Versioning—the capacity to take point-in-time snapshots of a Scope and all its contents.

References—the means by which entities may reference other entities

Group & HomeGroup Processes—the means by which users of the system are managed

Exemplary System Structure—a possible system structure using the elements previously defined Process Organisation—a means for organising and locating Processes within the system Migration—the means by which a Scope is moved to a new governing Process Authorisation—the means by which users are authorised to perform operation on system entities A RESTful cloud OS—An implementation of a computer Operating System using the elements previously defined.

Awards & Reputation—The means by which activity in the system confers awards and reputation.

Financial Systems and Marketplaces—the means by which currency is moved throughout the system and by which Groups operate as Marketplaces for software Developer Compensation—a mechanism by which Process vendors are compensated for use of their software Multiple Process inheritance—The means by which a Process may extend the behaviour of multiple other Processes Iteration One—Knowt This iteration is the definition of the primary data structure of the system—the Knowt (100). All data structures in the system ultimately inherit from Knowt, and thus every data structure in the system is a Knowt. This might be seen as similar to the Java programming language where everything must extend from the Object class, and is therefore an Object. The following code demonstrates a possible definition of the Knowt in pseudo-code that bears a strong similarity to the Google Application Engine data modelling mechanism using the python programming language. Data structures defined in this manner describe both the runtime data model and the persistent data model. Manifestations of the data structures represent instances in memory or records in the data store respectively.

```
class Knowt(db.Model):
key=db.Key( )
models=db.ListProperty(db.Key, required=True)
parent_scope=ScopeRefProperty( )
parent_entity=KnowtRefProperty( )
name=db. StringProperty(required=True)
description=db.TextProperty(default=" ")
sequence=db. FloatProperty(default=0.0)
hasChildren=db.BooleanProperty(default=False)
child_keys=db.ListProperty(db.Key, default=[ ])
contexts=db.ListProperty(db.Key, default=[ ])
instance_number=db. IntegerProperty(default=1)
snapshot=db.StringProperty(default=" ")
```

Note that the key uniquely identifies each record. For this iteration, it is important to note that Knowts may form a hierarchical structure (102). The parentEntity attribute references the parent Knowt in such a hierarchy, and the child_keys field contains the references to all the child Knowts in the hierarchy. The sequence field allows Knowts to be arbitrarily ordered in relation to their peers within the hierarchy. Other fields on the Knowt above will be described in subsequent iterations.

Iteration Two—Context

This iteration defines an additional data structure—the Context (104). It extends the definition of a Knowt via inheritance (106), and as such a Context is a Knowt, and exhibits all the same properties, plus those it defines itself

```
class Context(Knowt):
path=db.StringProperty( )
```

The Context adds the path field, which contains a Context's position in its parent-child hierarchy (a structural capability it inherited from Knowt) using Context names starting at the root. For example, if a Context with name 'foo' had a child Context with name 'bar', then the path attribute on the child Context might be represented as 'foo/bar', and the parent simply as 'foo'.

The contexts field on the Knowt is used to provide a Knowt indexing mechanism. A Knowt may exist in many contexts, stored in the contexts list field defined on the Knowt. Many Knowts may be indexed by a given Context, and thus there is a many-to-many relationship between Context and Knowt (108).

Iteration Three—Scope

This iteration defines an additional data structure—the Scope (110). It extends the definition of a Context via inheritance (112), and as such a Scope is both a Context and a Knowt, exhibiting all the same properties, plus those it defines itself.

```
class Scope(Context):
group=GroupRefProperty(required=True)
process=ProcessRefProperty(required=True)
roleMaps=ObjectProperty( )
roleUriPatterns=ObjectProperty( )
```

The additional fields of a Scope will be described in subsequent iterations. The provision of the Scope class provides the capacity to encapsulate a logical set of Context and Knowts (114). The Knowt class defines a parent_scope field, which is used to identify the Scope to which it belongs. A Knowt may only belong to one Scope (the parent_scope field is a singular reference)—and since both Context and Scope are Knowts, this logic applies to them as well. The Scope represents a generic data structure which may be used to encapsulate an indexed data set.

Figure 2:
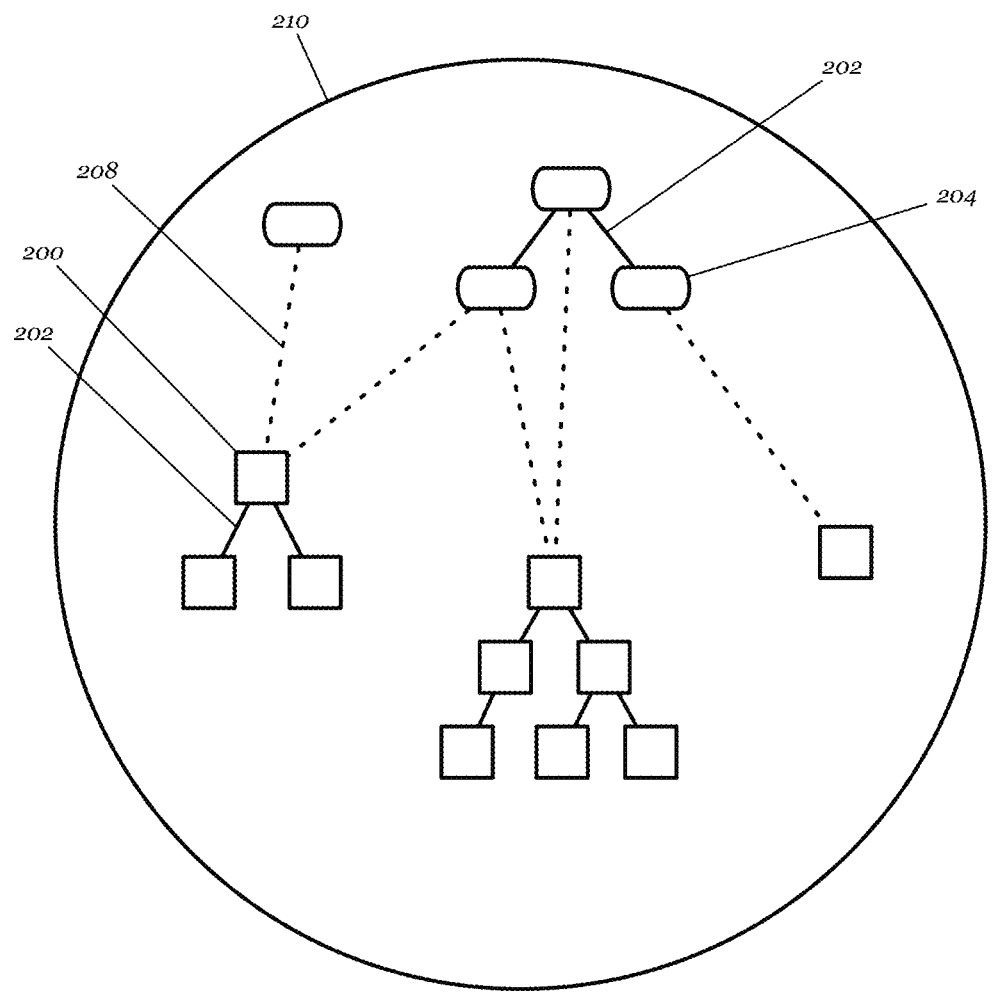
FIG. 2 shows an instance representation of the data structures in FIG. 1.

FIG. 2 provides an instance diagram—demonstrating how the structure defined by the relationship between Scope, Context and Knowt might manifest itself to deliver a Scope (210) containing Knowts (200) and Contexts (204). It also shows how the hierarchical structure defined by Knowt (102, 202) is utilized by Context, as well as the many-to-many relationship between Context and Knowt (108, 208). This graphical form representing a Scope instance, including the Contexts and Knowts which it might contain, will be used and expanded in many of the diagrams supporting this description. When this graphical form is used, Knowts will always be represented by squares, Contexts by capsules, and Scopes by circles, unless otherwise noted explicitly.

Having completed the third iteration, the resultant structures may recursively form hierarchies within hierarchies, using three distinct hierarchical mechanisms. Knowts may form simple parent-child relationships (102). Since every entity in the system extends from Knowt, this capability is available to every entity in the system. A Context may index many Knowts, and a Knowt may be indexed by many Contexts (108). This capability is available to every entity in the system that extends Context (including Scope). A Scope may form a simple parent-child relationship with Knowts, Contexts and Scopes (114).

Figure 3:
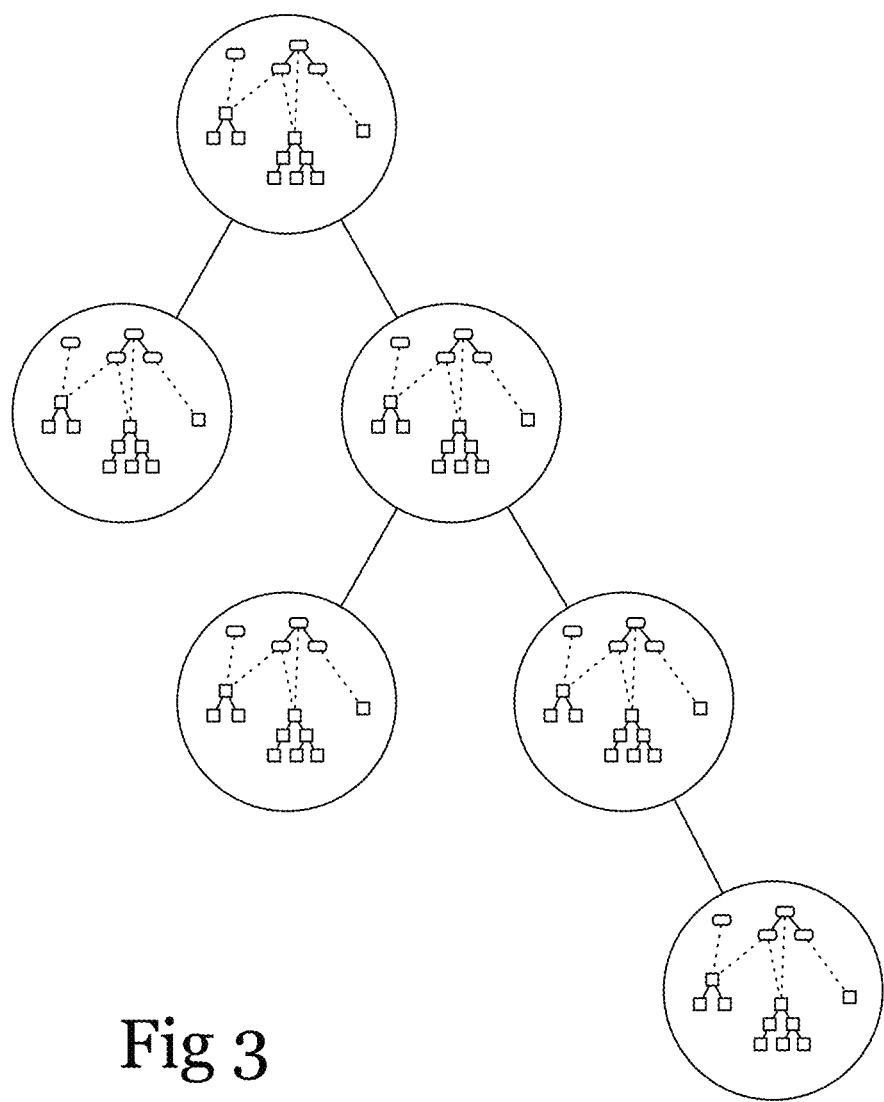
FIG. 3 and FIG. 4 illustrate the Process of recursive data representation.
Figure 4:
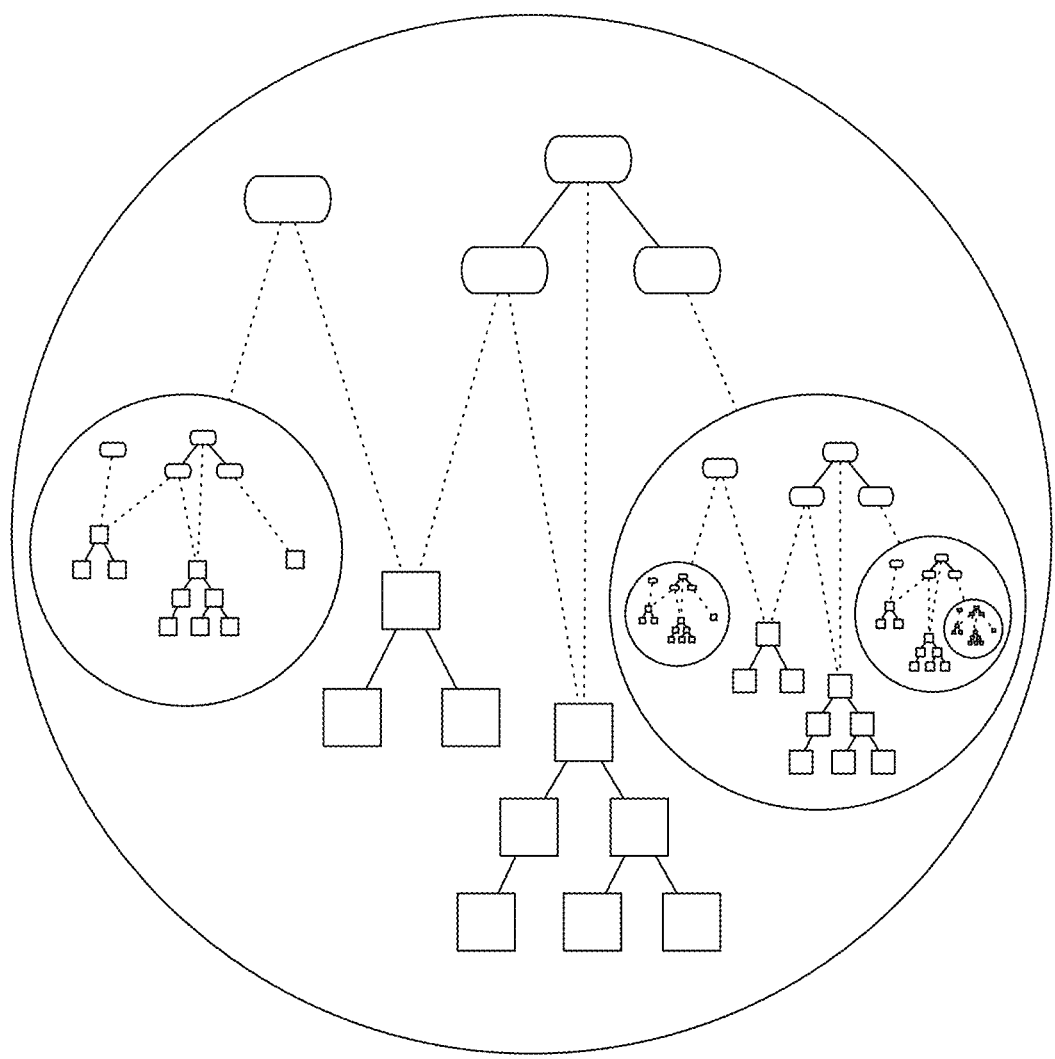

This structure contains a recursive device—Scopes may be the children of Scopes, using the same mechanism by which Knowts and Contexts belong to Scopes—Scopes inherit the parent_scope field from Knowt. This recursive structure is highlighted in FIGS. 3 & 4. FIG. 3 shows a more traditional representation of a hierarchy that may result from this mechanism, and FIG. 4 shows the same Scope hierarchy as FIG. 3, using a different representation. The representation from FIG. 4 will be utilized and expanded in many of the diagrams supporting this description. FIG. 4 more effectively demonstrates that because Scopes are Knowts, they may be treated as such by the system. FIG. 4 is also more effective at demonstrating the recursive, fractal nature of the structure defined in the first three iterations.

This recursive data structure is one of the primary building blocks of the system. The system is, in fact, completely defined using a hierarchy of Scopes. Every Knowt in the system (with the exception of the root Scope) defines exactly one parent Scope. Further iterations will provide a full realisation of the system using this structure.

At this point it is noted that two pieces of prior art may be relevant to the structure outlined in the first three iterations, and the following will highlight the points where the system of the present invention differs from these. In the Unix operating system there exists the concepts of files and directories. Directories are in fact files. Hierarchies of directories are used to index files, and use a path to identify a specific directory within that hierarchy. Files may only exist in one directory, although symbolic links may be used to achieve the goal of the file appearing to exist under more than one directory path. The file may be considered as roughly analogous to the Knowt, and the directory roughly analogous to the Context. There is no analogy for the Scope—a 'directory container' that may also contain 'directory containers' would provide the best equivalent if one existed. Also a file does not mandate structured content conforming to a model. In the system, Context and Knowt enforce structured content conforming to a model definition. Both the X.500 protocol and the Lightweight Directory Access Protocol (LDAP) define a Directory Information Tree (DIT, or naming context). The DIT does not distinguish between directories and files—simply containing hierarchical entries that may carry structured information conforming to object classes that form part of the definition underlying the DIT. An entry is located via a path consisting of the names of the entries. An entry performs the roles of both Knowt and Context, and the directory tree is roughly analogous to the Knowt hierarchy (102). An entry may only exist under a single path, although entries may be aliases to other entries so that they appear to exist in multiple locations. There may be many DITs. The DIT might be seen as roughly analogous to the Scope, however a DIT cannot contain another DIT. The ability of the Scope to contain other Scopes recursively, and the many-to-many relationship between Context and Knowt are fundamental building blocks of the system described herein.

Both of these prior art systems represent mechanisms currently in use for the hierarchical organization of data, and the system described herein differs markedly from each.

Iteration Four—Process

Figure 5:
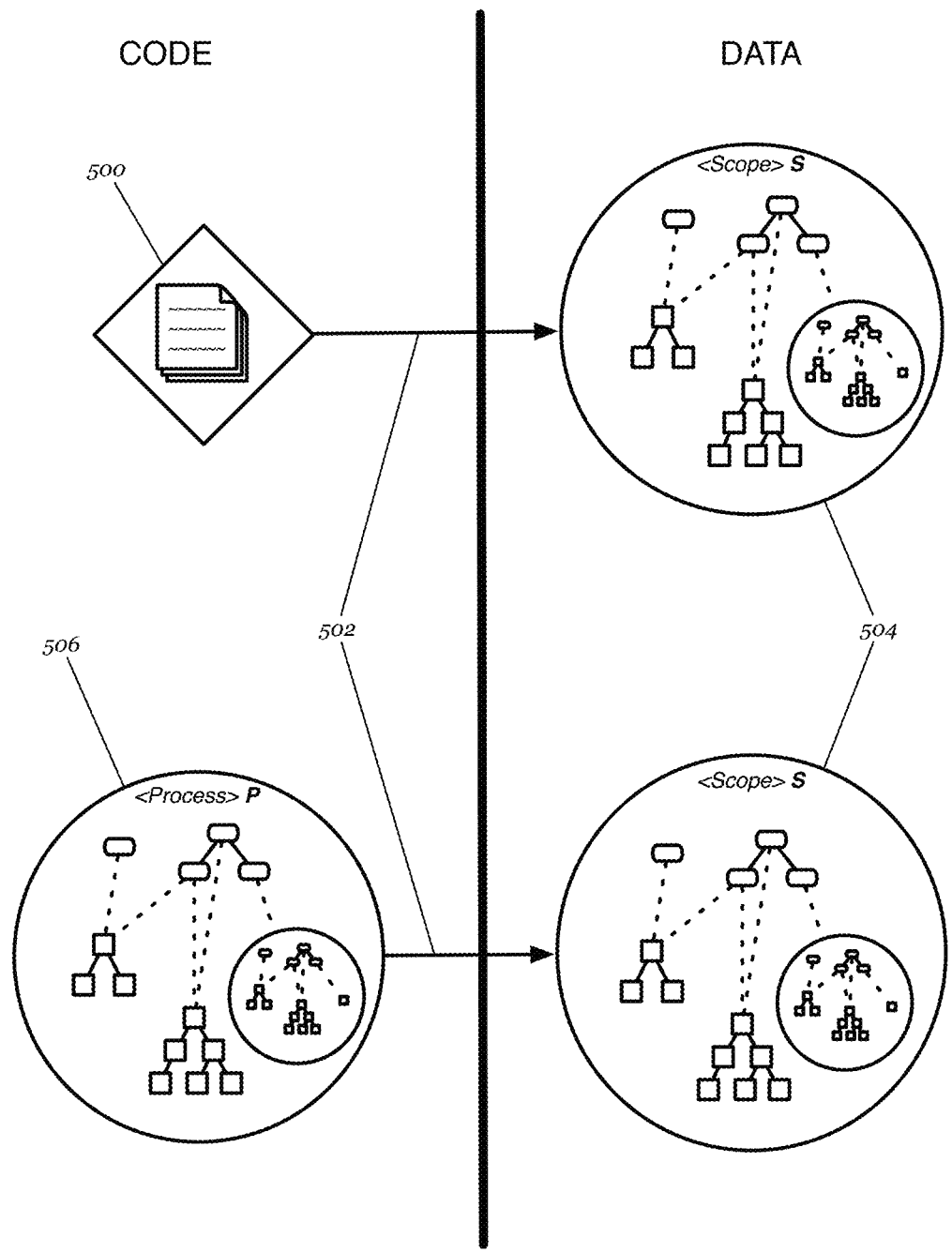
FIG. 5 illustrates the distinction between Processes and Data.

This iteration identifies the code that is required to operate on the data structures defined in the first three iterations. This code is itself contained within these data structures. One might observe a rough analogy in the Unix operating system where both code, and the data which it operates on, are stored in files. The important thing to note is that the distinction between code and data is dependent upon the context in which it is used. For example a file containing code is treated as data by the editor application used to create it, but as code by an interpreter application used to execute it. FIG. 5 shows a simple conceptualization of the code (500) that operates on (502) structured data (504), as well as the approach used by the system, where code is itself stored in a Scope data structure (506).

The system identifies the Scope as the primary containment structure, encapsulating hierarchies of Context and Knowt. From this perspective, the system defines a Process Scope (506, also referred to hereafter simply as a Process) that contains the code to operate on the data structures of another Scope. Every Scope has one and only one Process that contains the code to maintain its content. This is identified in the process field of the Scope class identified in iteration 3. FIG. 5 distinguishes between a Process Scope, and other Scopes. The definition of the Process class is:

class Process(Scope):
super_process=ProcessRefProperty( )
package=db.StringProperty(required=True)
aggregates=db.StringListProperty(defult=[ ])
releases=db.ListProperty(db.Key)
compensation algorithms=db.ListProperty(db.Key)
selected_algorithm=db.SelfReferenceProperty( )

It is important to note here that a Process inherits Scope—a Process is a Scope. The additional fields will be described in later iterations.

Figure 6:
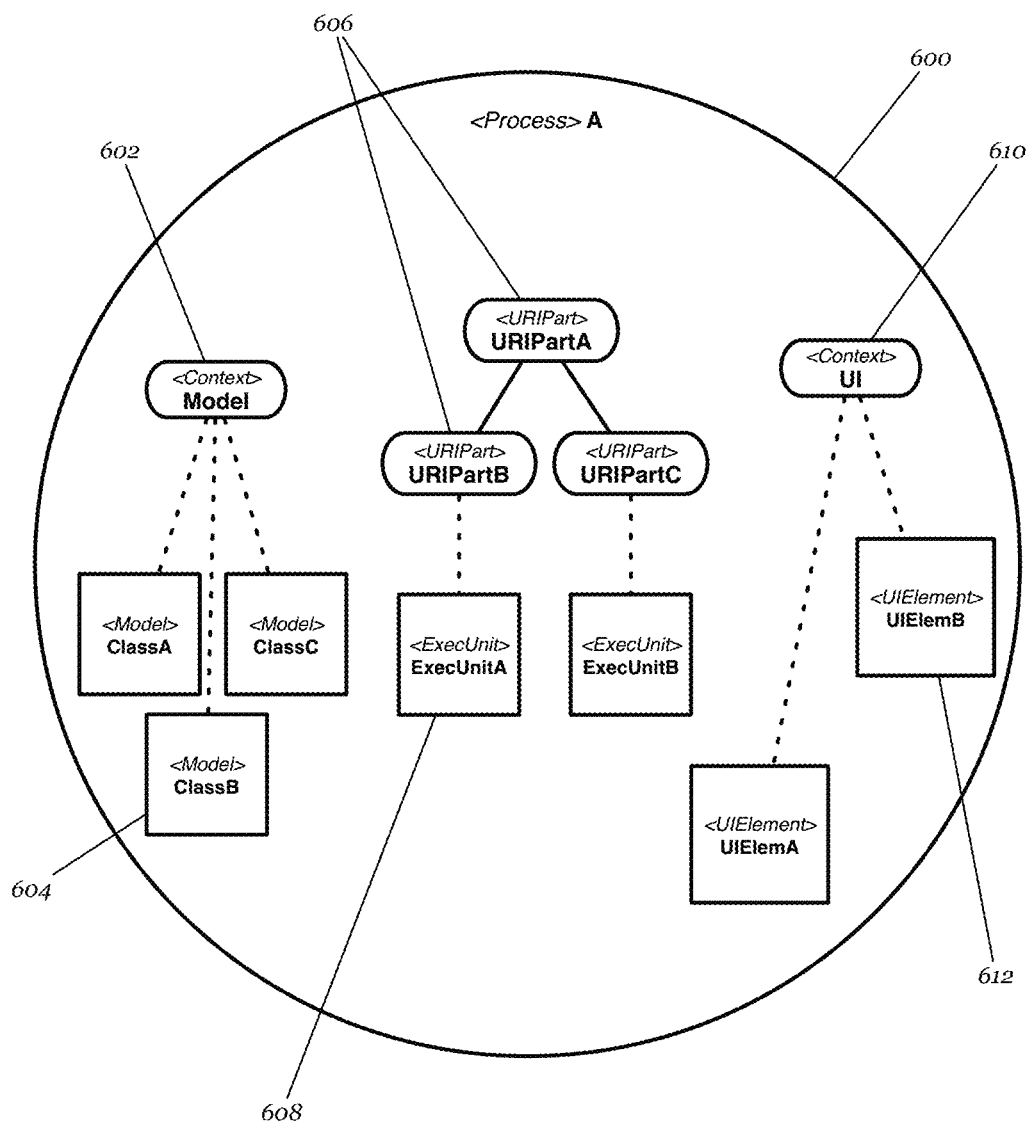
FIG. 6 illustrates the Process Scope contents.

FIG. 6 shows the potential contents of a Process Scope (600) in abstract terms. As will be demonstrated in subsequent iterations, a Process may take arbitrary form. Note that the labels on elements in this diagram consist of two parts; the first being a Model type indicated by an italicised name surrounded by '< >'. This defines the Model type (e.g. Scope, Context etc.) of the element. The second part is an element name, which is arbitrary. This convention will be used in many of the other diagrams supporting this description. Note that many of the objects in FIG. 6 are of types that will be defined in iteration 7, along with the mechanism by which they are defined.

A Process potentially defines any of the following:

1. Model (604)—a definition of the data structures that are supported in the Scope that the Process governs. As noted in iteration 1, all data structures must ultimately inherit from Knowt, although they may do so by extending a subclass of Knowt (e.g. Context, Scope etc.). In the implementation described, a Process may only define one model that extends from Scope or a Scope subclass—and this is the Scope type that the Process operates upon. It may be convenient to index the Model under a suitably named Context (602). Note that the models field of a Knowt identifies the actual Model of a Knowt. For convenience, this field is a list of all the Models in the inheritance chain for a knowt. For example, for a Scope this field would reference the model definition for Scope, the model definition for Context and the model definition for Knowt as 3 separate list items. Consequently this field will, for every entity in the system at the very least contain a reference to the definition of the Knowt model. Further detail of Model definitions is contained in subsequent iterations.

2. RESTful interface (606)—this defines a set of RESTful URI patterns that may be used to map code contained within the Process to incoming HTTP requests. When a HTTP request identifies a resource within a Scope managed by this Process, the URI corresponding to the HTTP request is matched against the defined set of RESTful URI patterns to determine the code that should be executed. In simple terms, a URI (Uniform Resource Identifier) is generally understood to be composed of parts, and as a whole uniquely represents a resource or collection of resources in a system. For example, 'document123/author' might uniquely refer to the author (or authors) of a specific document in a particular system. In simple terms, the system description uses RESTful URI to mean a URI that also consists of a HTTP method (usually one of POST, GET, PUT or DELETE) to be applied to a specific resource. In the example, one might use 'document123/author/POST' to add an author to the document, or 'document123/author/GET' to retrieve the authors of that document. It is important to note that many different ways of representing and matching RESTful URI are possible, and as described in later iterations, different Processes or Process versions may provide alternate implementations within the running system. In the system described, the components of a RESTful URI are of Model type UriPart. A possible implementation of a RESTful URI mechanism is presented in iteration 9.

3. Server Code (608)—this provides the actual code for operating on the data structures in the Scope that this Process is intended to manage. In the system described, these code elements are of Model type ExecUnit. ExecUnits are indexed under the RESTful URI that are used to invoke them. In the implementation described, only one active ExecUnit may be indexed under a given UriPart. Invoking the RESTful URI will result in the execution of the indexed ExecUnit.

4. User Interface (612)—this provides the means for a user to interact with the process via a web browser. It may be convenient to locate the user interface components under an appropriately named Context (610).

Note that where the term Code Knowt is used in the description, it is intended to mean Knowts within a Process that contain code. An ExecUnit is an example of a Code Knowt, as is a UIElement. The system implementation may define a Code Model type from which Models such as ExecUnit and UIElement inherit. Where Code Knowts are identified within the description, this is the intended meaning.

It is beneficial at this point to begin construction of an exemplary application using the concepts introduced in each iteration. For this purpose, consider a simple project management application that supports the Scrum iterative project methodology. In this methodology, the primary unit of work is the Task, and Feature is comprised of a collection of Tasks. Desired Features are stored in a prioritized Product Backlog, with the most critical having the highest priority. Each iteration is called a Sprint, and represents a fixed period of time. Sprints are executed repeatedly and sequentially until the Product Backlog is exhausted or the Project otherwise ends. Features are added to a Sprint in priority order, and according to the amount of resources available to work on them. A common issue with the application of the Scrum methodology is that the Product Backlog is simply a flat list of features. In a large project (regardless of the methodology), features are generally categorized—if the project were to build a car, then features might be categorized by 'chasis', 'engine', 'mechanical', 'electrical' etc. One possible solution to this need is to introduce the concept of a feature map—a secondary structure allowing the categorization of Features using Tags. Consequently the exemplary application will add the feature map to the standard Scrum definition.

Implementation of such an application in the system is achieved with a Process implementation operating on a Scope that contains the data for a particular Project. For the purpose of the exemplary application, this process is called the Scrum Process.

The Model definition for the Scrum Process might contain the following elements:
Project extends Scope
Feature extends Knowt
Task extends Knowt
Backlog extends Context
Product Backlog extends Backlog
Sprint extends Backlog
Tag extends Context Each of these model elements might define additional fields beyond those defined in the base class that they extend. For example the Sprint might define start_date and end_date.

Figure 7:
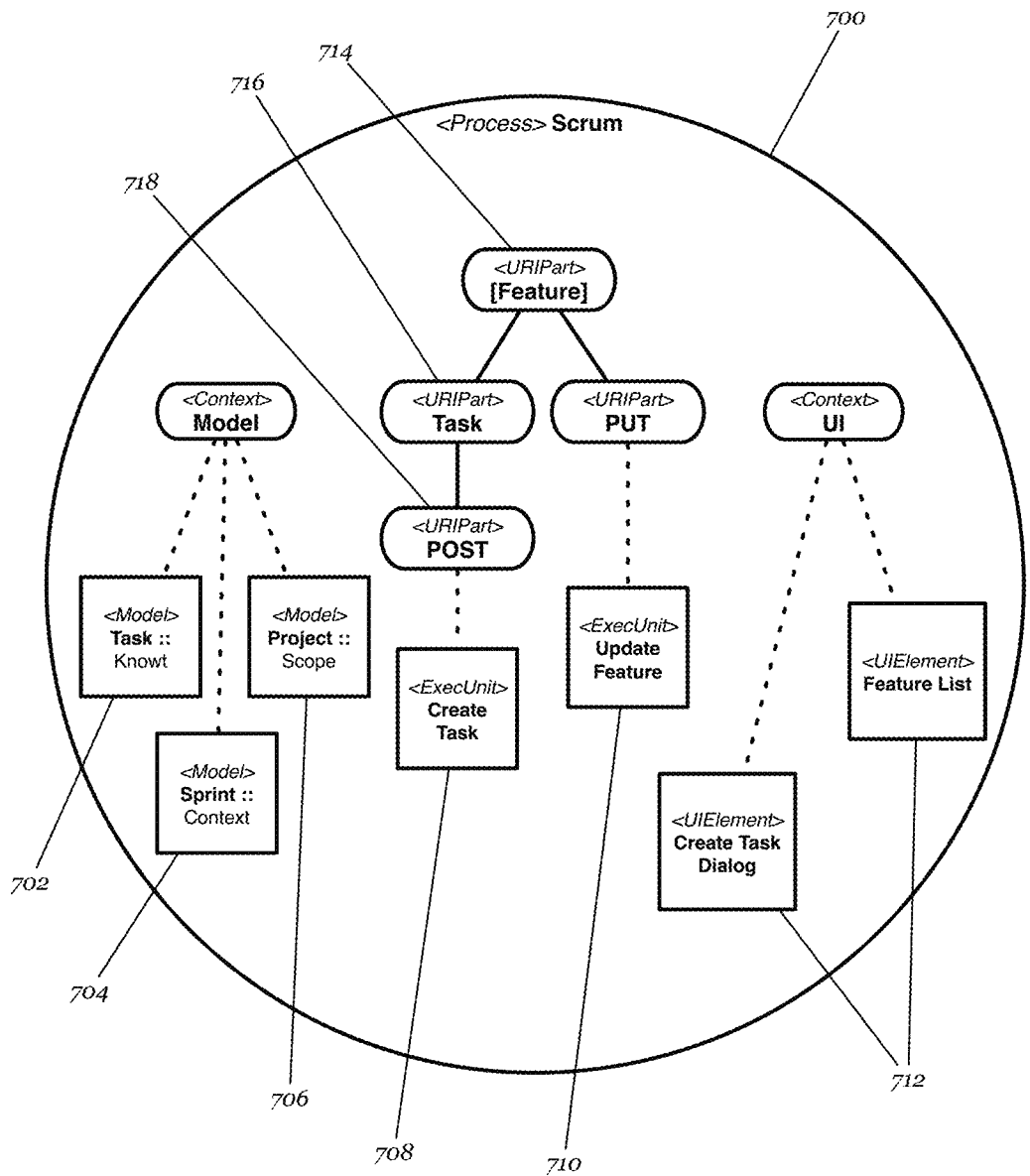
FIG. 7 illustrates and example application process.

FIG. 7 shows how some of the elements of the Scrum Process (700) might be manifested. These are a subset of the full Process definition, intended to demonstrate key element of the Scrum Process. The Task (702), Sprint (704) and Project (706) Model elements are indicated. The representation of these Model elements contains 3 parts. As indicated in the fourth iteration, the first two represent a Model type (in this case the Model type is actually 'Mode'), and an arbitrary name. The third part is separated from the second by two colons ('::') and indicates the Model type which this Model definition extends. For example, '<Model> Task:: Knowt' indicates that the Knowt is of type Model and defines a Model named 'Task' which extends from Knowt. Further details of the means by which Model definitions are realised is contained in the seventh iteration. Additional elements of FIG. 7 are described in later iterations.

Iteration Five—Process Instantiation

This iteration defines a mechanism by which a Process has the capacity to create, or instantiate the Scopes on which it operates. For example, the Scrum Process has the capacity to create Project Scopes. Note that the terms 'Process instance' and 'Scope' have identical meaning—all Scopes are instances of exactly one Process. A similar mechanism can be observed in the Java programming language, where a single class definition governs many class instances, and the class itself is able to create the instances it governs via the new operator.

Figure 8:
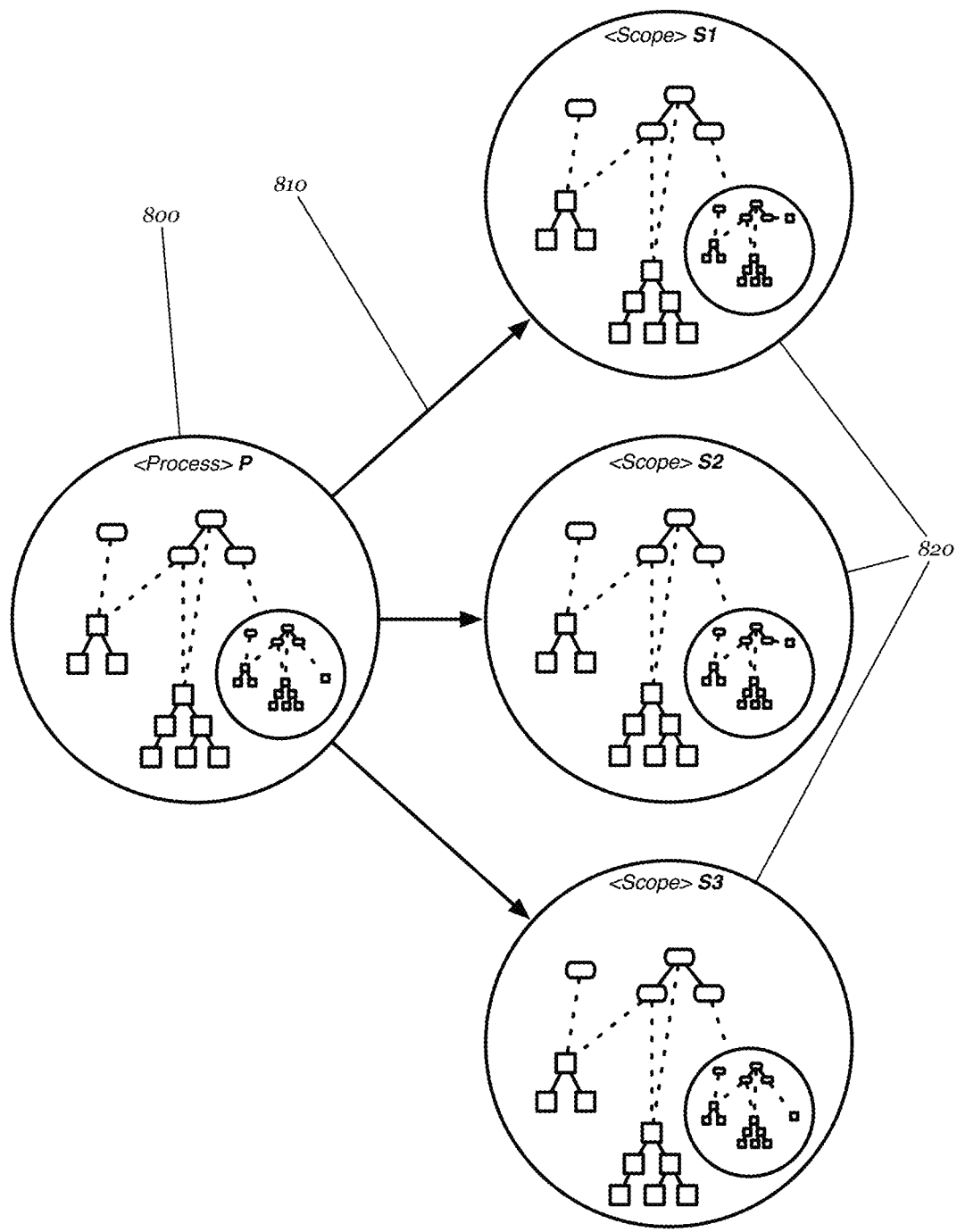
FIG. 8 illustrates scopes that are both created and maintained by a process.

FIG. 8 shows an example of how this structure manifests in the system. It shows that a Process (800) may instantiate (810) many Scopes of the same type (820). The functionality exposed by the Process (800) is used to manipulate the data structures in each Scope (820). Process instantiation is initiated by specifying that a Scope (the Process) should be created within another Scope. This is achieved through invocation of a RESTful URI on the Scope within which a new Process instance should be created, and providing the key of the Process that should be instantiated—the act of POSTing a process instance to a Scope.

The invoked ExecUnit in turn invokes a specific URI on the specified Process (broadly analogous to the 'new' mechanism in Java) in order to create the instance, with the ExecUnit for the originally invoked URI then placing the instance within the scope identified in the original call. Finally, each Process may define a constructor execunit and corresponding constructor URI that is subsequently called by the originally invoked execunit. The constructor may create any additional structures that are required in the new Scope instance. A similar construction mechanism is seen in the Java programming language, with each class definition defining a constructor (or being assigned a default one) for the same purpose. Additional details on an implementation of RESTful URI are provided in iteration eight.

It is this mechanism of Process instantiation that enables structures like that in FIG. 4. In the end, the act of instantiating a Process and placing an instance within another Scope is just a specialised application of the mechanism by which Knowts are created within a Scope—Scopes are Knowts.

As noted previously, a Process contains Model definitions, and ExecUnits capable of creating, updating, retrieving and deleting instances of those Model definitions. Note that each instance of a Model element created by a Process in a Scope is assigned a sequential number generated using a counter within that Scope, and stored in the instance_number field of the Knowt shown in iteration one. Since a Scope created by a Process is an instance of a Model element in the Process, every Scope instance of a Process has an instance number as well.

Figure 9:
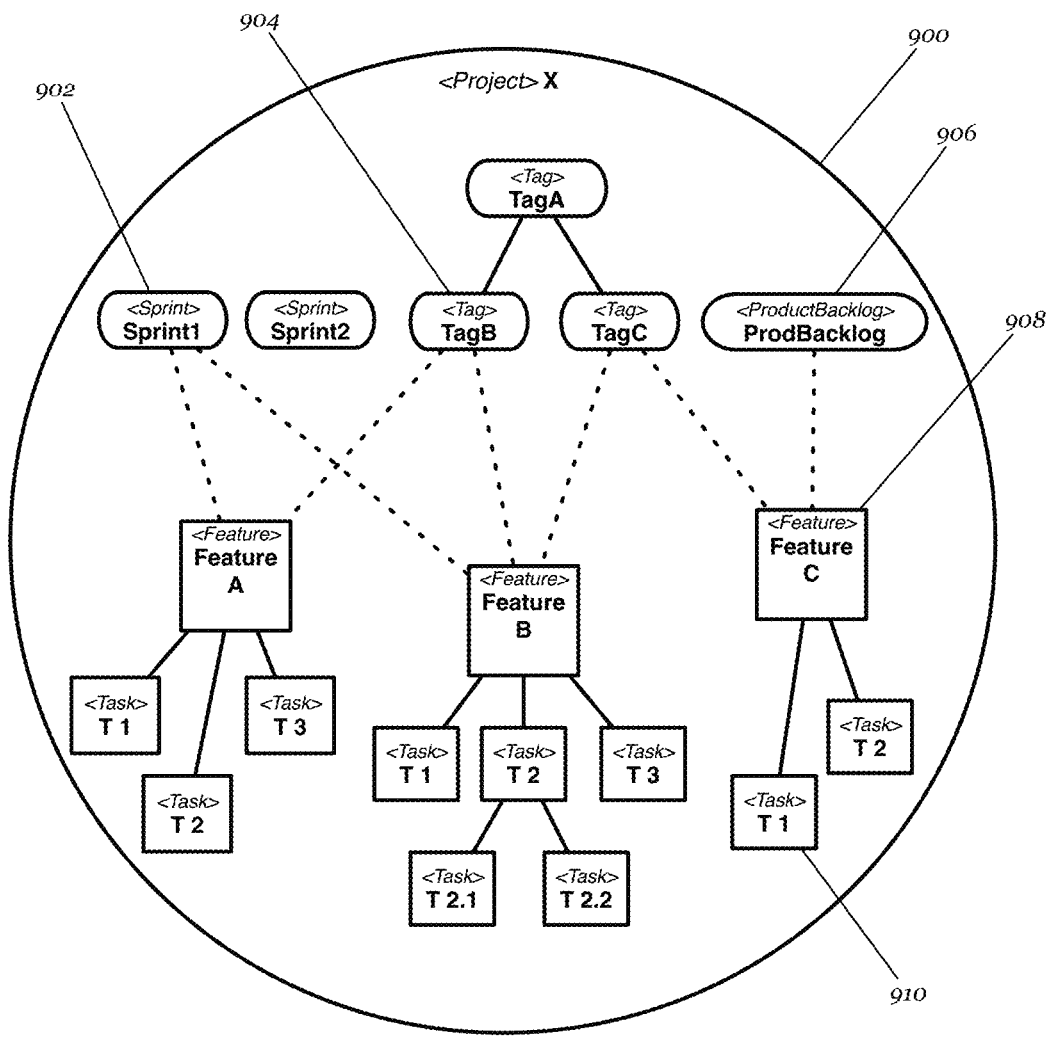
FIG. 9 shows an instance of the scrum process.

By way of example, FIG. 9 shows a possible instance of the Scrum Process. This instance contains elements using the type definitions available to the Scrum Process—Project (900), Sprint (902), Tag (904), ProductBacklog (906), Feature (908) and Task (910) are all indicated.

A Process may define other aggregate Processes. These are contained in the aggregates field of the Process entity, and are references to other Processes in the system. When a Process that defines aggregate Processes is instantiated, instances of the aggregate Processes are created as sub-scopes of the Scope instance of the Process defining the aggregates. Given that these aggregate Processes may themselves define aggregate Processes initiating a single instantiation can result in a complex hierarchy of Scopes. From this perspective, the term aggregate is intended to mean the predefined composition of a Process instance of one or more other Process instances.

Iteration Six—Process Process

Figure 10:
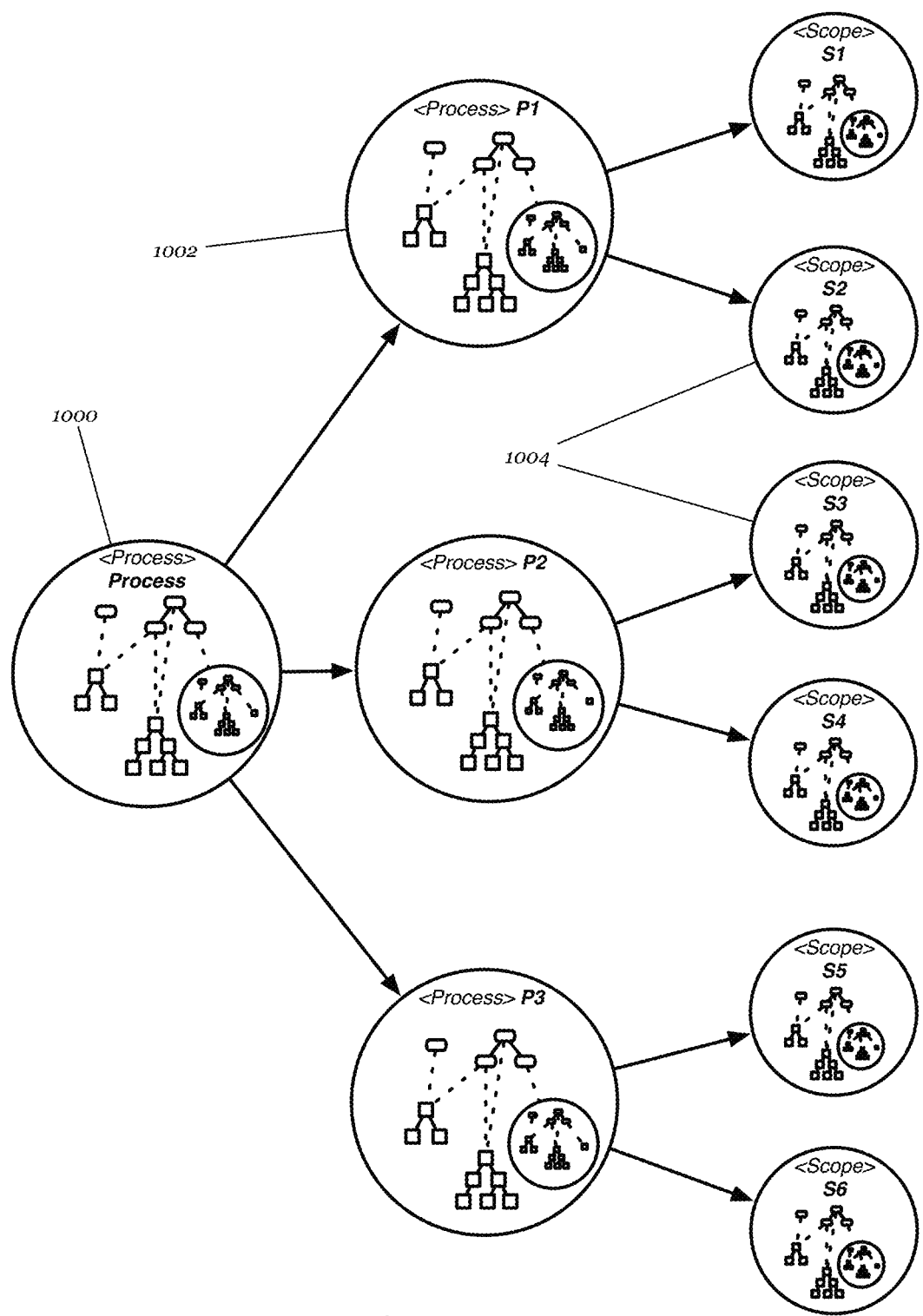
FIG. 10 illustrates the process of creating a Process.

This iteration defines the Process Process: a Process that is used to operate on the data in Process Scopes. All Scopes are instances of a Process, and this applies equally to Processes themselves. The Process Process is a Process whose instances are Processes. This structure is shown in FIG. 10. This shows the Process Process (1000) creating Process instances (1002), and those Processes in turn creating other Scope instances (1004).

Note that the Process Process is a Process like any other, and as such consists of the elements outlined for all Processes in iteration 4. It does not require any additional elements. However, somewhat uniquely, the Process Process is an instance of a version of itself. This may seem counterintuitive—yet it conforms the basic principles previously outlined—all Scopes are governed by a single Process—Processes are Scopes, and governed by a Process Process.

An analogy for a Process Process being an instance of itself can be observed in the class structure of the Java programming language, where all classes are instances of the Class Class, including the Class Class itself.

Figure 11:
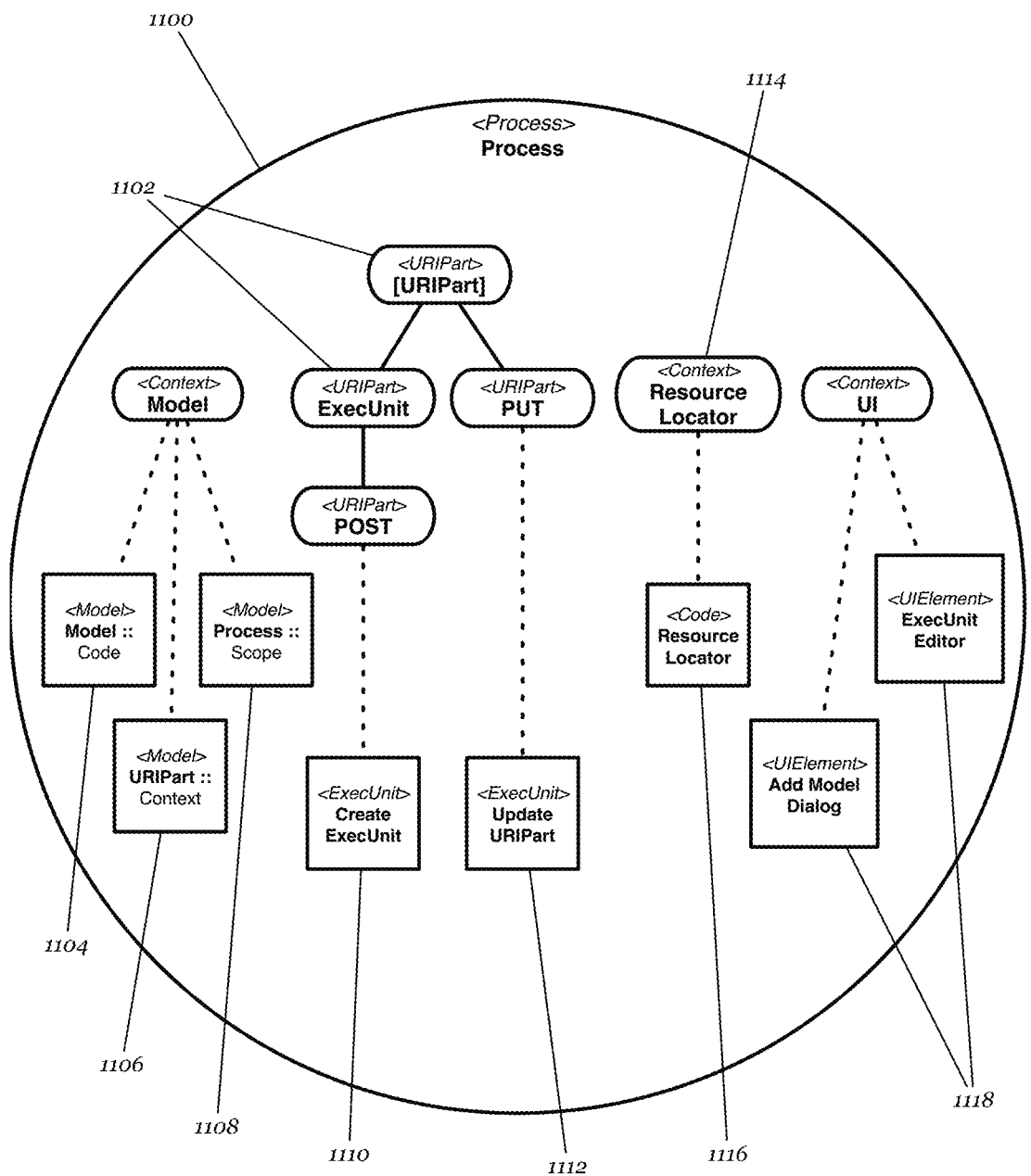
FIG. 11 illustrates the Model definition of a Process.
Figure 12:
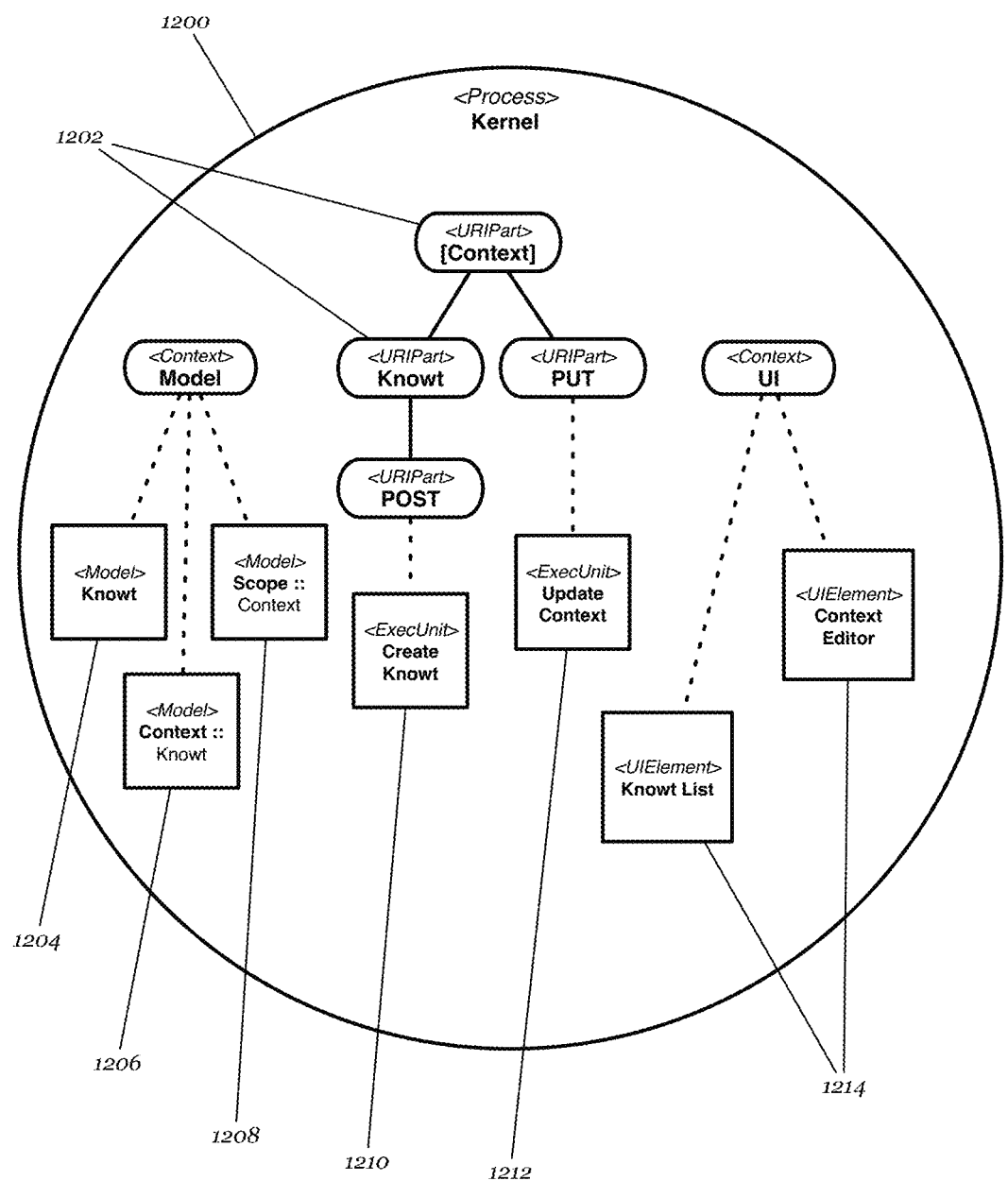
FIG. 12 illustrates the Kernel Process.

FIG. 11 shows a subset of the full definition of the Process Process (1100). The Model definition for the Process Process defines the Model Model (1104)—this is the Model type in which Model definitions are stored—i.e. the definition of the Model type is stored in a Knowt instance of type Model. The UriPart (1106) and Process (1108) Model types are also indicated. Additional elements are described in later iterations, however of particular note is the addition of the Resource Locator, (1116), which is described in further detail in the ninth iteration. Briefly, the Resource Locator is responsible for resolving an incoming URI to invoke an ExecUnit.

Also of note is the fact that the RESTful interface of the Process Process represents the API for maintaining Processes—a Process development API. This API is suitable for the creation for ExecUnits, UriParts, and any other Models defined by the Process Process. Similarly, the UI definition for the Process Process represents a user interface for maintaining Processes; it provides a development environment. Thus defining Models, adding UI, defining URI and server code is a task performed by a user of the system using the UI and RESTful URI defined by the Process Process. Indeed, since the Process Process is an instance of itself, this development environment is used to maintain the Process Process.

Iteration Seven—Process Inheritance

Figure 16:
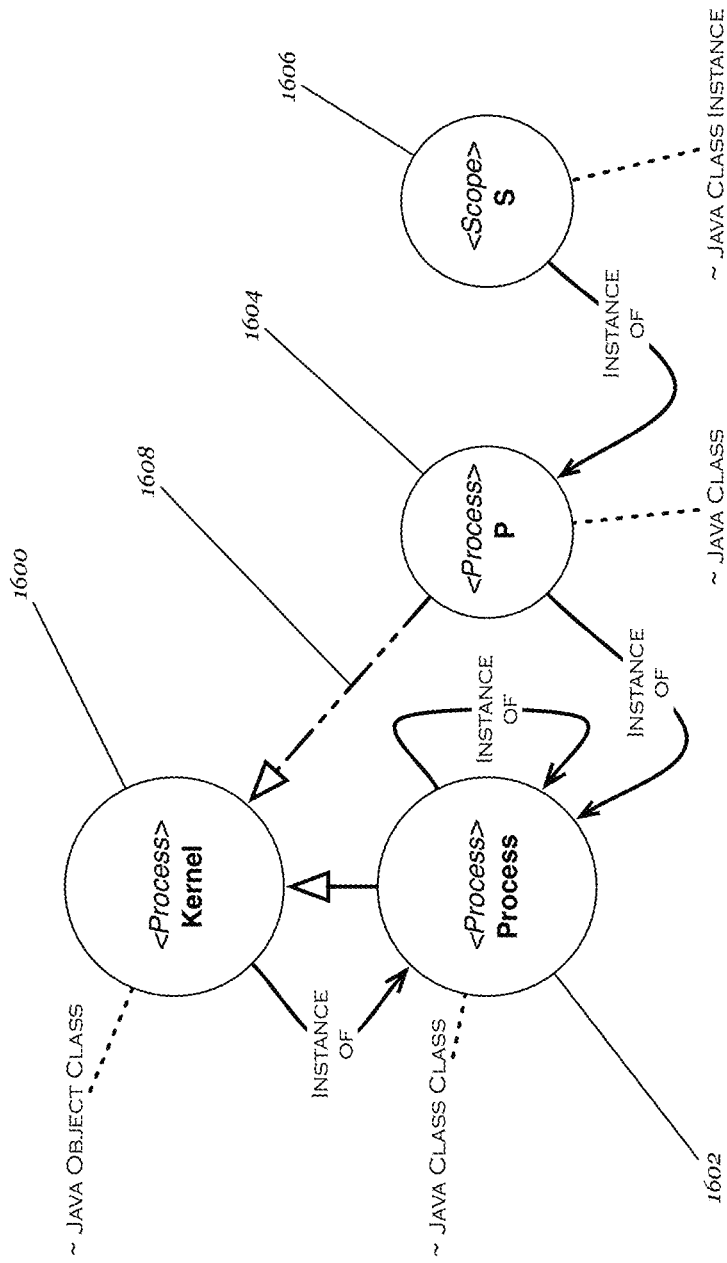
FIG. 16 illustrates the relationship between the Kernel Process, Process Process, Process and Scope, highlighting similarities to the Java programming language constructs of Object, Class Class, Class and Class instance respectively.

This iteration defines a mechanism of Process inheritance. The mechanism of Process inheritance is analogous to the class inheritance mechanism in the Java programming language, as shown in FIG. 16. The important differences however, are that Process inheritance defines a means by which whole application structures are able to inherit each other, as well as the provision of the set of model types which may manifest within the instances of a Process. The root of a Process inheritance hierarchy is a Kernel Process (1200, 1600). The Kernel Process is the only Process that does not extend another Process. Process inheritance chains may be arbitrarily deep. The super_processes field of the Process entity defined in iteration 4 contains the reference to at least a Process's super Process (i.e. that which the Process extends). Preferably, for convenience, the super_processes field contains the list of Keys of all Processes in the inheritance chain, from the immediate super process to the Kernel.

Figure 14:
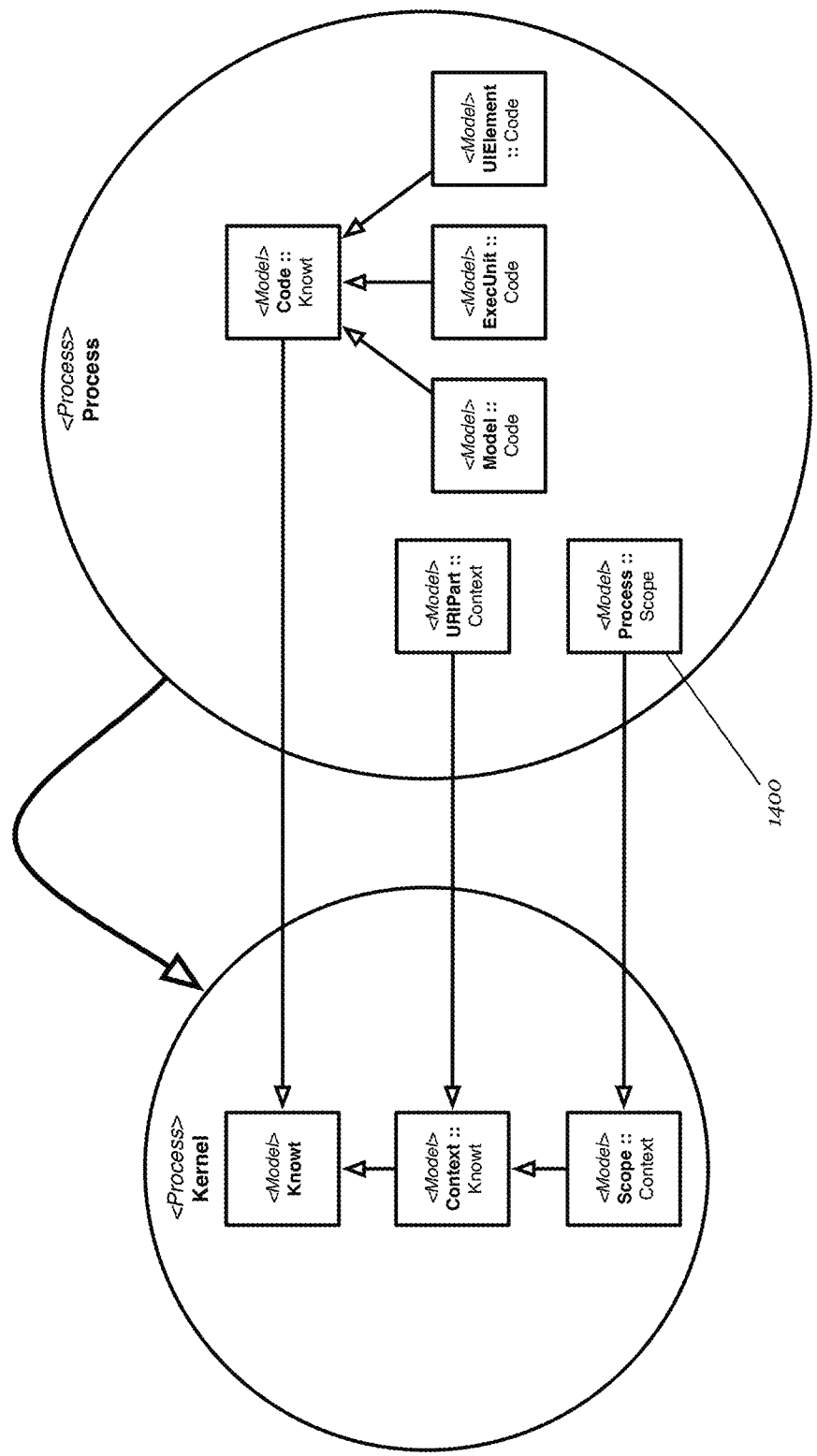
FIG. 14 illustrates the Model definition of both the Kernel and Process Processes, highlighting both the model inheritance hierarchy and its relation to the process inheritance hierarchy.
Figure 15:
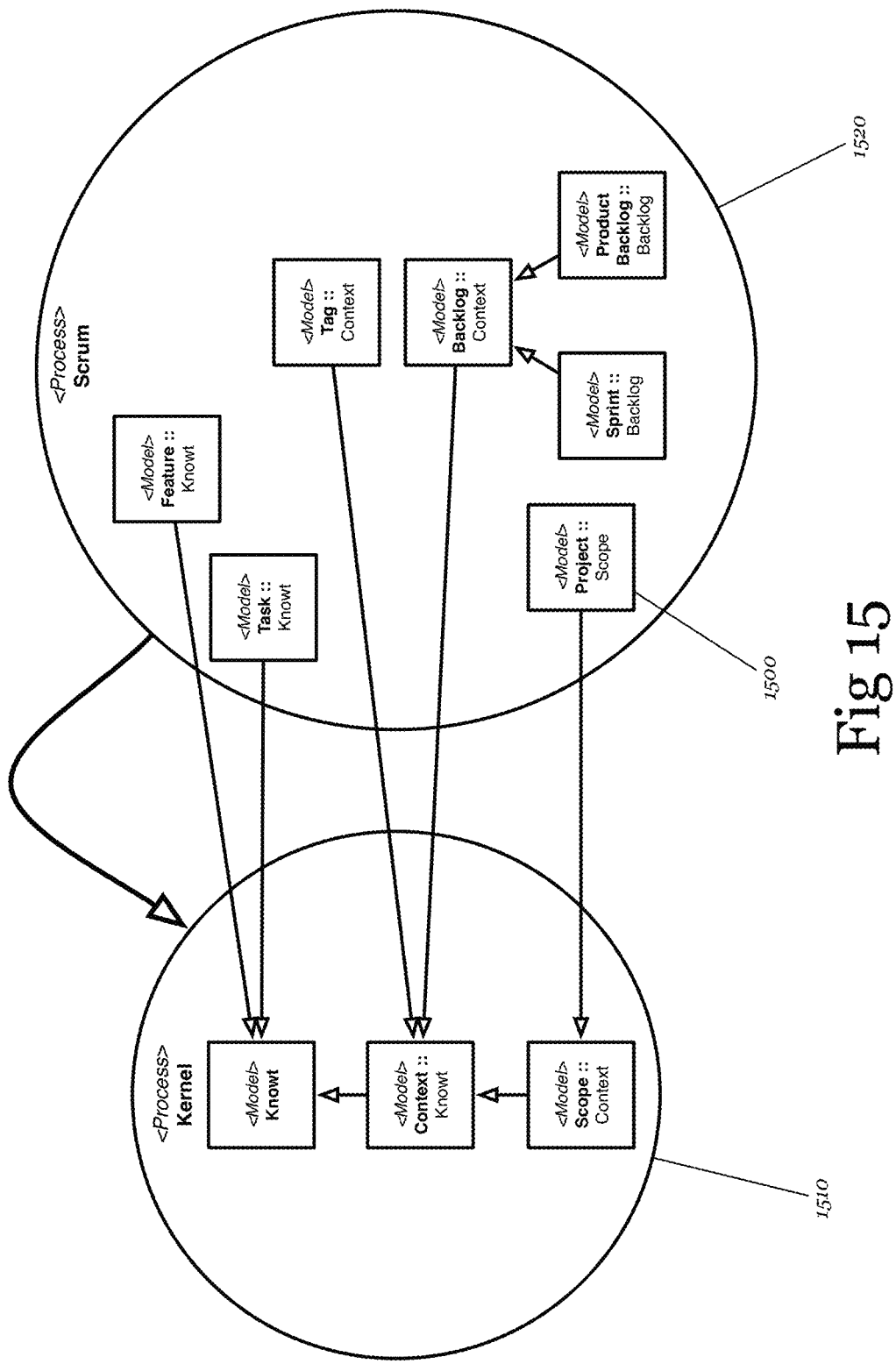
FIG. 15 illustrates the Model definition of both the Kernel and Scrum Processes, highlighting both the model inheritance hierarchy and its relation to the process inheritance hierarchy.

The Model definitions within a Process form an inheritance hierarchy rooted on the Knowt model definition. FIG. 14 shows a Model definition for the Process Process, including inheritance hierarchies, while FIG. 15 shows the Model definition of the Scrum Process previously described, including inheritance hierarchies. Note that the definitions for Knowt, Context and Scope are defined in the Kernel Process, and thus available to all sub-Processes—since a Kernel Process is always the root of the all Process inheritance hierarchies.

Throughout the system description, whenever a Model class is referenced, it is generally understood to mean both the Model class and subclasses of the Model Class. In object oriented terminology this is known as polymorphism. For example, when referring to Scopes, it is understood that Processes may also be included in the identified set (because they are Scopes by virtue of inheritance). Consequently, when referring to Knowt, any entity in the system may be included in the identified set. For example, when referring to the Knowts within a Project, this includes Tasks, Features and all other instances of the Model types defined in the Scrum Process Model hierarchy. The term 'entity' is used throughout the description to refer to an instance of a Model. For example an instance of the Feature Model may be referred to as a Feature entity.

With Process inheritance, a sub-Process inherits all of the elements of its super-Process. This includes the Model, the User Interface, the Server Code and the RESTful interface. As is usually the case with inheritance in software, a sub-Process may define new or additional functionality. Consequently a sub-Process may define new Model elements (as well as using those of the super-Process), define additional User Interface elements, Server Code such as ExecUnits and UriParts and RESTful URI.

The Kernel Process (1200) contains the definitions of Knowt (1204), Context (1206) and Scope (1208) outlined in the first three iterations—the basic Model elements from which a sub-Process may inherit when defining their own Model. FIGS. 14 & 15 show the Model inheritance hierarchy for the Process Process and Scrum Process respectively. A Process that extends the Scrum Process will not only be able to define Model elements which extend from Scope, Context and Knowt, but also from Project, Feature, Task, Backlog, Product Backlog, Sprint and Tag. In this way, increasingly complex Process definitions may be created with a larger Model, more intricate User Interface, increased server functionality and a broader RESTful interface.

It is possible to define no additional content in a new Process, however its behaviour will be indistinguishable from that of its super-Process. A new Process may define as little or as much new content as required—new Model, UI, Server Code and RESTful URI are optional. In a preferred embodiment is compulsory for a Process to define at least one Model that extends from the Scope Model object of the Process being inherited—thus the Scrum Process defines the Project model inheriting from Scope, and a sub-Process of the Scrum Process must contain a Model definition that extends from Project.

The mechanism underlying Process inheritance bears a strong resemblance to that of the Java programming language. The important difference is that in Java, the mechanism is used to support class inheritance, while in the system described it is used to support inheritance of entire application processes including server code, RESTful interface, user interface and Model. It is also the case that Process inheritance defines the set of available complex data types via the Model definitions in the Process inheritance chain FIG. 16 highlights the structure of the Process inheritance and instantiation mechanism, and is annotated to indicate where analogous Java elements exist. The following describe the key pieces of information in this diagram: 1) The root of the Process inheritance hierarchy is the Kernel Process (1600). Every Process must ultimately inherit (1608) the Kernel Process, but may do so by inheriting a subclass of the Kernel Process. The Kernel Process is analogous to the Object Class in Java. 2) Every Process is an instance of a Process Process (1602), including the Kernel Process. A Process Process is a Process like any other, and as such inherits from the Kernel Process. The Process Process is analogous to the Class Class in Java, which inherits the Object class and is also an instance of itself. 3) A Process (1604) is analogous to a Java Class. To this point, the Kernel Process, the Process Process and the Scrum Process have been defined. 4) Every Scope (1606), including Process Scopes, are instances of a Process. A Scope is analogous to a Java Class instance. Like every Class in Java is an instance of the Class Class, including the Class Class itself, every Process is an instance of a Process Process, including the Process Process itself.

Iteration Eight—Request Handling

This iteration defines the high level mechanism by which the system services RESTful requests. Note that the system expects all RESTful URI to contain the key of a Knowt as the first URI element. Since every entity in the system is a Knowt, this mechanism is able to uniquely identify every entity in the system, as well as collections related to those entities. A collection is intended here to mean any set of Knowts which is associated with another Knowt via the relations outlined in the first 3 iterations—parent child relations between Knowts (102), indexing relations between Context and Knowt (108) and containment relations between Scope and Knowt (112). It is perfectly reasonable that other relationships may be defined in other Processes, and the RESTful URI described here would be suitable for extension to include these. It is expected that where the type of relationship is ambiguous, that a HTTP request parameter may be supplied to identify the relationship intended.

Figure 17:
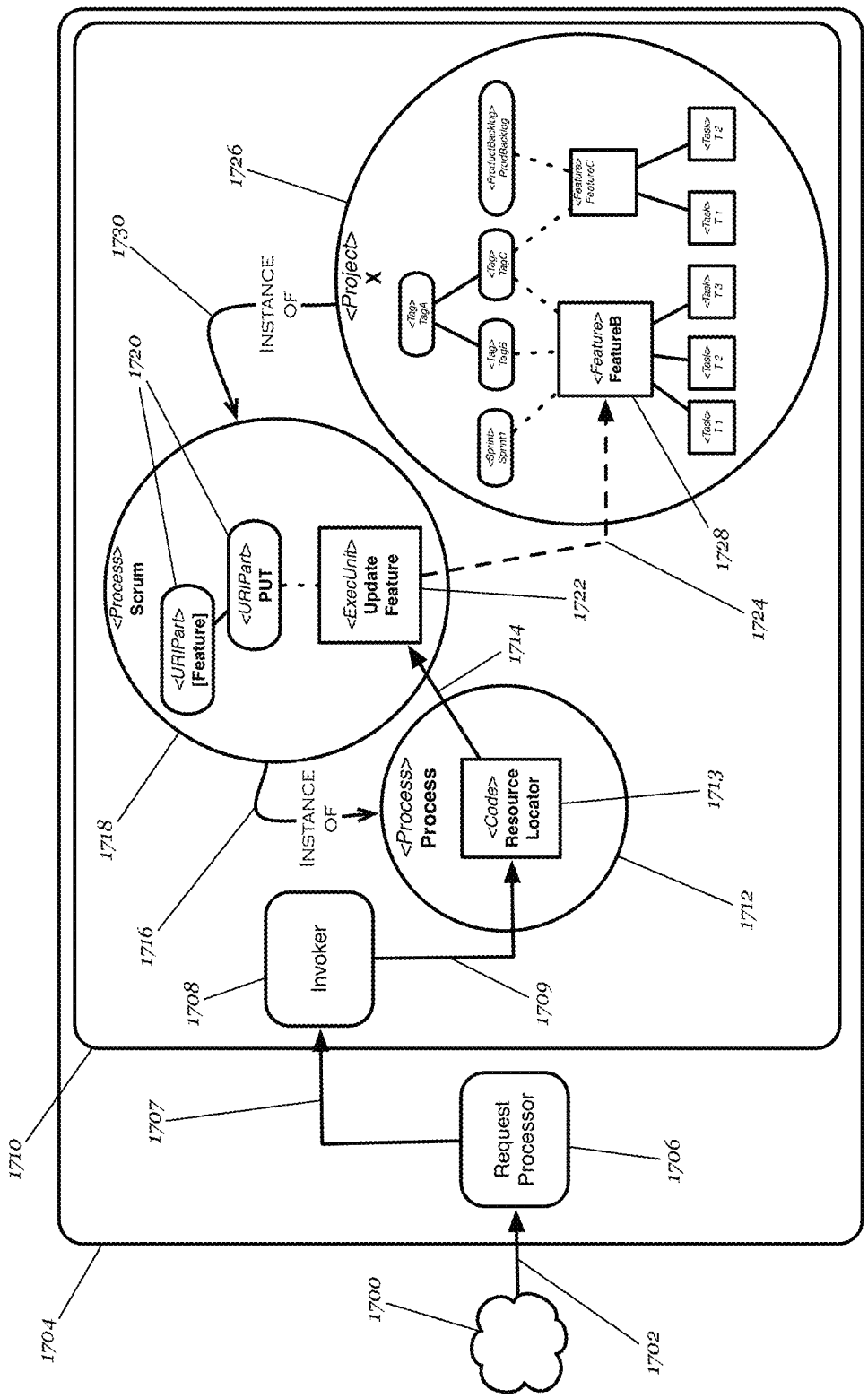
FIG. 17 illustrates the path of a sample request from inception to execution of desired functionality.

FIG. 17 shows the flow (1702, 1707, 1709, 1714, 1724) of the request from the point where it is received from the web (1700), to the point where a data Knowt (1728) is updated (1724). The diagram uses the example of a request intended for a Project (1726), which is an instance (1730) of the Scrum Process (1718). The Scrum Process is an instance (1716) of a Process Process (1712). The example URI pattern is [Feature]/PUT (1720), with the actual URI being 'ABC123/PUT', assuming 'ABC123' is the key of the Feature entity in the Project shown in FIG. 17.

FIG. 17 shows two major regions (1704, 1710)—the first represents a part of the system where code is not stored in a Process, or indeed in any Knowt. The Request Processor is the only code in this part of the system, and must be developed and deployed via independent means external to the system described. The Request Processor represents the 'bootstrap' of the system described, meaning that it is responsible for loading the remainder of the code required to realise the runtime system according to the mechanism described in the remainder of this iteration, and outlined in FIG. 17. The bootstrap mechanism is described in more detail in iteration sixteen. The Request Processor (1706) is responsible for receiving incoming HTTP requests and translating them into a call to the Invoker (1708). The Invoker is responsible for determining the appropriate Resource Locator(s) to invoke. The second major region (1710) contains the elements that are contained in the Knowt hierarchy described in previous iterations. This represents the overwhelming majority of the system—everything in this region is a Knowt (or subclass of Knowt), conforming to the structures previously defined. Consequently the entirety of the system (excluding the Request Processor) may be maintained through the use of RESTful URI defined within the system. This includes Processes, and thus the system is able to create, refine and redefine its own behaviour. This is made possible by the fact that the code on which the system runs—the Code Knowts within Processes—are maintainable via the same RESTful API capabilities as any other Knowt in the system—everything is a Knowt, including system code. This is a useful innovation and improves the utility of the system described.

The Invoker represents a special case. In the implementation described, it is stored in a Code Knowt in the Kernel Process under an appropriately named Context (e.g. 'invoker'), and may be modified using the mechanisms previously outlined i.e. through the API of the governing Process Process. However, because the Resource Locator must know which version (see iteration ten for a discussion of the Process versioning mechanism) of the Kernel Process to load the Invoker from, the key for the version of the Kernel Process from which the Invoker should be loaded must be known to the Resource Locator. This key value must be made available to the Request Processor through a means external to the system described. A number of possibilities exist, and may be dependent upon the underlying infrastructure to which the system is deployed. Some possible ways in which this key value could be maintained include:

(A) The value could be stored in a single field of a separate database table, and maintained through the administration capabilities of the database. In Google App Engine for example, the database can be administered for this purpose through the Google App Engine Admin Console. (B) The value could be deployed with the Request Processor in a configuration file. (C) An additional flag field on the Kernel Process may indicate the version of the Kernel Process that is to be used. Only one version of the Kernel Process sets this field, and the Request Processor can identify it through a database query on this field. (D) Other possibilities exist, and are likely to be dependent upon the cloud infrastructure to which the system described is deployed.

The Request Processor (1706) is also responsible for catching exceptions and errors from the system and converting them into error responses defined by the HTTP protocol.

The Invoker described determines the correct Resource Locator(s) to invoke through the following logical sequence:

1. Loading the entity uniquely identified by the key in the first part of the RESTful URI. In the Scrum Project example supported by FIG. 17, this would be the target Feature (1728).

2. Loading the Scope (possibly from memory cache) referenced in the parent_scope field (1726) of the entity from step 1.

3. Loading the Process (possibly from memory cache) referenced in the process field (1718) of the Scope from step 2.

4. Loading the Process hierarchy (possibly from memory cache) referenced in the super_processes field of the Process from step 3. Note that FIG. 17 does not show the process hierarchy of the Scrum Process.

5. Loading the Process Process (1712), possibly from memory cache, referenced in the process field of each of the Processes from step 4. Note that FIG. 17 does not show each of the individual Process Processes corresponding to the process hierarchy of the Scrum Process.

6. Loading the Resource Locator defined in each Process Process identified in step 5.

7. Use the RESTful URI resolution mechanism described in iteration nine to sequentially make Resource Locator calls to find and execute code from the Process identified by the RESTful URI resolution mechanism of iteration nine for the current step in the sequence. It is often the case that this mechanism results in multiple ExecUnits being called in a sequential chain FIG. 17 does not show the chain of ExecUnit calls that may be made to update the target Knowt. The dashed line used (1724) is intended to convey that the update may not be performed directly by the ExecUnit (1722) shown in the diagram.

The Invoker (1708) object is passed to the Resource Locator, which in turn makes this object available to every ExecUnit that is invoked. An ExecUnit may then use the Invoker to invoke other RESTful URI. By this means, any ExecUnit is able to use the Invoker to call a RESTful URI from within the system—an ExecUnit may make many such calls to service the RESTful request for which it has itself been invoked. For example, adding a Task to a Feature in a Scrum Project may also require the Feature to be updated to increment a counter that represents the number of Tasks it contains. From this perspective, it can be seen that RESTful URI forms the API of the system as a whole, both internally and externally.

The above represents the logical stages required for the Invoker to establish the correct Resource Locator(s) to handle a given URI—many mechanisms exist to optimise the performance of this behaviour on a per request basis. The main options here include: A) Creating the entity key of an object from a hash of the fields required—the parent_scope field of the entity, the process field of the parent Scope, and the process field of the governing Process could all be included, and thus the information required from steps 1, 2, 3 & 4 are readily available in the key, ensuring the intermediate objects do not require loading. Note that the instance number of the target entity would also need to be included in the hash to ensure the key generated from the hash was unique. B) In memory caching of elements such as Processes (including Process Processes) for quick retrieval and invocation. In practice a combination of these two approaches is likely to deliver the best results.

Iteration Nine—RESTful URI

This iteration describes the mechanics of an exemplary Invoker implementation and how it services the incoming URI. It takes advantage of both the Model inheritance hierarchy, and the Process inheritance hierarchy.

As noted in the fourth iteration, a RESTful URI consists of UriParts plus a HTTP method. The HTTP methods POST, GET, PUT and DELETE are used in this description, however others such as HEAD and OPTIONS may be supported. The generally accepted meanings for the described operations—Create, Read, Update & Delete respectively are used for the implementation described, however the system does not mandate that ExecUnit implementations should follow this convention.

As described in the eighth iteration, incoming HTTP requests are translated into a call to a Resource Locator (1713) implementation in a Process Process. Also noted in the eighth iteration was that every URI begins with a Knowt key—this is called the Target Key. This means that there are at least as many unique and valid URI as there are Knowts in the system. Consequently it is necessary to define a mechanism by which many different URI are able to map to the same URIPart and related ExecUnit, as it may be unsustainable to define individual UriParts and ExecUnits for each unique URI. For the system described, URI patterns are used to match many incoming URI to the same URIPart path and related ExecUnit. Looking at the Scrum Process (700), two example URI path definitions are provided:

1. [Feature]/PUT—this will match any URI where the key provided in the URI is for an entity of Model type Feature, and the HTTP method is PUT. As described in the eighth iteration the Target Key is also used to identify the Scope on which we are operating, so this URI pattern (1720) will apply to any Feature entity in the identified Scope (1726). The caller can expect that the mapped ExecUnit will update the identified Feature (710), based on the common understanding of the PUT method in HTTP parlance.

2. [Feature]/Task/POST (714, 716, 718)—this will match any URI where the Target Key is of Model type Feature, the second part of the URI is equal to the string 'Task', and the HTTP method is POST. The second part of the URI identifies a collection of type Task—i.e. the collection of Tasks under the Feature. The caller can expect that the mapped ExecUnit will create a new Task under the identified Feature (708), based on the common understanding of the POST method in HTTP parlance.

These represent the two primary mechanisms for handling RESTful URI in the implementation described. These forms can be further abstracted to:

1. [<TargetModel>]/<HTTP Method>—all HTTP methods are supported except POST. This is because HTTP POST is analogous to 'Create', and it is nonsensical to Create an entity which already exists. POST is only supported in the second form.

2. [<TargetModel>]/<CollectionModel>/<HTTP Method>—all HTTP methods are supported, although PUT may have limited applicability, since it would imply updating a collection of Knowts of Model type CollectionModel, based on the common understanding of the PUT method in HTTP parlance.

According to the HTTP specification, a HTTP request may contain parameters as part of the request. For the system described, these parameters are made available to the Invoker by the Request Processor, to the Resource Locator by the Invoker, and to the ExecUnit by the Resource Locator when it is executed. '[Feature]/PUT' for example will require the data to be updated. ExecUnits may parse these parameters for the information required to service the request.

Note that it is necessary for the described Invoker to load the Model hierarchy represented by the Process inheritance chain for the request. The previous iteration describes the mechanism by which these Processes are established by the Invoker as part of the request handling Also note that for a URI to possibly match an incoming URI, both <TargetModel> and <CollectionModel> should represent Model types available to the Process. For example, a URI that can be possibly matched for a Scrum Process instance should use types shown in FIG. 15. This is intuitive—the Scrum Process cannot be aware of any other Model types, and for the <TargetModel> it would not be possible for a key representing an entity of any other type to be directed to the Scrum Process via the mechanism described in the eighth iteration—all entities in a Scrum Process instance must be of type from its Model space. As shown in FIG. 15, this includes the Model types inherited from its super Process chain.

An analogy for the RESTful URI mechanism is that RESTful URI supported by Processes are like methods on a Java Class—they represent the API of the Process. In Java, methods may override behaviour in similarly named methods of the super Class, and have the facility to call 'super( )' from the new method declaration to invoke the super Class implementation of the same method. A similar, but more powerful concept is supported in the described Invoker implementation that follows.

Looking at the URI: [Feature]/Task/POST, two facts are notable: 1) It consists of Model type names that belong to the inheritance hierarchy defined in the governing Process that ultimately ends in Knowt. 2) Model types in the inheritance hierarchies may come from an arbitrarily long chain of Process inheritance. For example in FIG. 15, some of the types come from the Kernel Process (1510), and some from the Scrum Process (1520).

In the Invoker described, an incoming URI is first turned into its URI Type Pattern—e.g. 'ABC123/Task/POST' would map to [Feature]/Task/POST if 'ABC123' were the key of an instance of the Feature model. In order to execute this URI, a Resource Locator would match the URI Pattern against a UriPart path defined in the Process inheritance chain of the Scrum Process. It is important to note that there may be more than one matching URI pattern defined in this inheritance chain.

It is not necessary for a Process to define the precise type pattern first calculated by the Resource Locator—i.e. [Feature]/Task/POST need not be defined for the incoming URI to be serviced. The Invoker will cycle through the type hierarchies of the <CollectionModel> and the <TargetModel> respectively, establishing a set of URI patterns. The following list shows an example of the order in which the cycles occur and the Process in which the type pattern is looked up:

1. [Feature]/Task/POST: Scrum Process lookup
2. [Feature]/Knowt/POST: Scrum Process lookup
3. [Knowt]/Task/POST: Scrum Process lookup
4. [Knowt]/Knowt/POST: Scrum Process lookup
5. [Knowt]/Knowt/POST: Kernel Process lookup This will be referred to as the URI Type Hierarchy. The lookup will be undertaken by the Resource Locator that is defined in the Process Process that governs the Process identified for that cycle. If any of those URI type patterns are matched in that order in the indicated Process then the associated ExecUnit will be invoked. This is a very powerful feature—and allows the Process implementation to leave out a URI if its behaviour is the same of that of an already defined ExecUnit higher in its URI Type Hierarchy. It is quite possible that in the Scrum Process, creating a Task under a Feature is the same as creating a Knowt under a Knowt, and as such the process author may choose not to define [Feature]/Task/POST, knowing that the implementation of [Knowt]/Knowt/POST is sufficient. The set of URI patterns for which an ExecUnit exists is called the Resolved URI Type Hierarchy. Recall that the Process Process exposes URI that enable the maintenance of Model instances that it defines. The basic means of process authoring is: A) Create an instance of a Process Process, providing the super process from which to inherit as a parameter to that RESTful call. B) Make RESTful API calls on the newly created Process to add, update, read, delete the required Model instances (such as ExecUnit & UriPart) as required to deliver the desired functionality for the Process.

Utilising this mechanism, the described Invoker also provides the means for an ExecUnit to call super( )—to invoke the next declared URI Pattern in the URI Type Pattern Hierarchy. Extending the example for the URI Type Hierarchy of [Feature]/Task/POST, assume that [Feature]/Knowt/POST, [Knowt]/Task/POST and [Knowt]/Knowt/POST do not have an ExecUnit defined for the Scrum Process, this leads to the Resolved URI Type Hierarchy:

1. [Feature]/Task/POST: Scrum Process lookup
2. [Knowt]/Knowt/POST: Kernel Process lookup The Resolved URI Type Hierarchy represents the elements of the URI Type Hierarchy for which there are definitions in the corresponding Process. In this example, the Resource Locator will invoke the ExecUnit for [Feature]/Knowt/POST from the Scrum Process, which will have the opportunity to call super( ) should it need to invoke [Knowt]/ Knowt/POST. In this way, a Process may extend or override the URI definitions of the super Processes in a much more flexible way than simple signature matching (such as that provided in Java).

Additional examples are required. Consider the URI Type Pattern [Sprint]/Feature/POST. Its URI Type Hierarchy would be:
1. [Sprint]/Feature/POST: Scrum Process lookup
2. [Sprint]/Knowt/POST: Scrum Process lookup
3. [Backlog]/Feature/POST: Scrum Process lookup
4. [Backlog]/Knowt/POST: Scrum Process lookup
5. [Context]/Feature/POST: Scrum Process lookup
6. [Context]/Knowt/POST: Scrum Process lookup
7. [Context]/Knowt/POST: Kernel Process lookup
8. [Knowt]/Feature/POST: Scrum Process lookup
9. [Knowt]/Knowt/POST: Scrum Process lookup
10. [Knowt]/Knowt/POST: Kernel Process lookup The first observation is that the URI pattern in 6 & 7 (and 9 & 10) are the same, but the Process used to look them up differs. This is because the URI Type Pattern is valid in both of these Processes—the types identified in the URI pattern are available in both Processes. This makes it possible for the Scrum Process to override the definition of [Context]/ Knowt/POST (or [Knowt]/Knowt/POST), adding additional behaviour and calling super( ) or changing the behaviour entirely without calling super( ) As noted earlier, only URI Type patterns whose Model types are known to the Kernel Process are looked up in the Kernel Process—so, for example, [Backlog]/Feature/POST will not be looked up in the Kernel Process. This mechanism applies to arbitrarily long Process inheritance chains.

The second observation is that each time the <Collection-Model> reaches the end of its inheritance hierarchy (Knowt), the <TargetModel> moves to the next Model type in it's inheritance hierarchy, and the <CollectionModel> begins again at the original Model type specification from the original URI pattern ([Sprint]/Feature/POST). This cycle continues until the <TargetModel> reaches the root for its inheritance hierarchy. Consequently, a URI of form 2—[<TargetModel>]/<CollectionModel>/<HTTP Method>—will always have [Knowt]/Knowt/<HTTP Method> as the final pattern in the URI Type Hierarchy. In practice, this means that the mechanics of actually performing the generic operation can generally be delegated to super( ) and ExecUnit implementations of sub-Processes of the Kernel Process are generally very light—they often do not need to be defined, and if they do, they often do not need to do much work. For example, the ExecUnit which is indexed by [Knowt]/Knowt/POST is responsible for physically adding the Knowt to the data store, so ExecUnits indexed by URI patterns higher in the Resolved URI Type Hierarchy may generally call super( ) to have this work performed. This results in a significant reduction in the amount of code required to implement behaviour in the system. Generally, the Kernel Process does the majority of the work across the entire system with each sub-Process adding small amounts of code specific to their operational requirements.

The third observation is that the Process used to perform the lookup is always reset to the original Process (determined by the mechanism defined in iteration eight) every time the <CollectionModel> is iterated. This ensures that overrides in Process hierarchy chain are honoured for every URI in the URI Type Hierarchy.

The final example shows the URI Type Hierarchy for [Sprint]/PUT—this situation is much simpler:
1. [Sprint]/PUT: Scrum Process lookup
2. [Backlog]/PUT: Scrum Process lookup
3. [Context]/PUT: Scrum Process lookup
4. [Context]/PUT: Kernel Process lookup
5. [Knowt]/PUT: Scrum Process lookup
6. [Knowt]/PUT: Kernel Process lookup The <TargetModel> cycles through its type hierarchy until [Knowt]/PUT on the Kernel Process. Similarly to before, the Process used to perform the lookup is reset to the original Process (as determined by the mechanism defined in iteration eight) every time the <TargetModel> is iterated.

Iteration Ten—Scope Snapshot Versioning

This iteration defines a means by which a read-only snapshot of a Scope's contents may be created. While all Knowts may be individually versioned by keeping a change history, snapshot versioning is a mechanism that versions an entire set of Knowts under the same snapshot version tag. The snapshot field of a Knowt identifies the snapshot version tag to which it belongs. This iteration defines the following additional model type:
Snapshot extends Context In the system described, a snapshot may be taken of any Scope by creating a copy of the Scope and all of the Knowts that identify it as their parent Scope. The snapshot version of the Scope may not be modified. For example, a snapshot of a Project, which is an instance of the Scrum Process, would represent a read-only, point-in-time copy of the Project. The snapshot would consist of the Scope and its child Knowts, such as Features and Tasks.

POSTing a Snapshot entity to the Scope creates a snapshot. The path attribute of the Snapshot entity is used as the value for the snapshot field on every Knowt in the snapshot. This allows simple association of each copy that belongs to the snapshot. This is broadly similar to the tagging capability in a source control repository.

The snapshot field of the Knowts in the current editable Scope (i.e. the Knowts from which a snapshot is created) holds a special marker value of 'HEAD' (although any arbitrary marker could be used), which indicates that the Knowt belongs to the current live and mutable set of Knowts in the Scope. Consequently a given Scope has one mutable live copy, which is the copy on which update operations are performed, and may have any number of read-only snapshot copies.

It is possible to restore a snapshot to replace the mutable live copy, and thus snapshot versioning provides a means for creating point-in-time backups of a Scope and its contents. It is also the case that the different versions of a Process identified throughout the description are snapshot versions of the identified Process Scope. Further details of the Process organisation mechanism are provided in iteration fourteen.

Iteration Eleven—References

This iteration describes a means of referencing Knowts (and subclasses of Knowt). Every Knowt is uniquely identifiable by its key, and as such this key can be used to reference the Knowt using reference fields defined in other entities in the system. There are many such references identified in the earlier iterations in this description. For example, a Knowt defines the parent_scope field of type ScopeReference to identify its parent Scope. From a raw data store perspective all of these reference fields are simply Knowt keys or lists of Knowt keys. The description uses terms like ScopeReference, GroupReference, ProcessReference to elucidate the Model type that is being referenced. In the system described these may be defined as valid field types that validate that the reference points to the correct Model type, however this is not a requirement.

Iteration Twelve—Group & HomeGroup Processes

Figure 18:
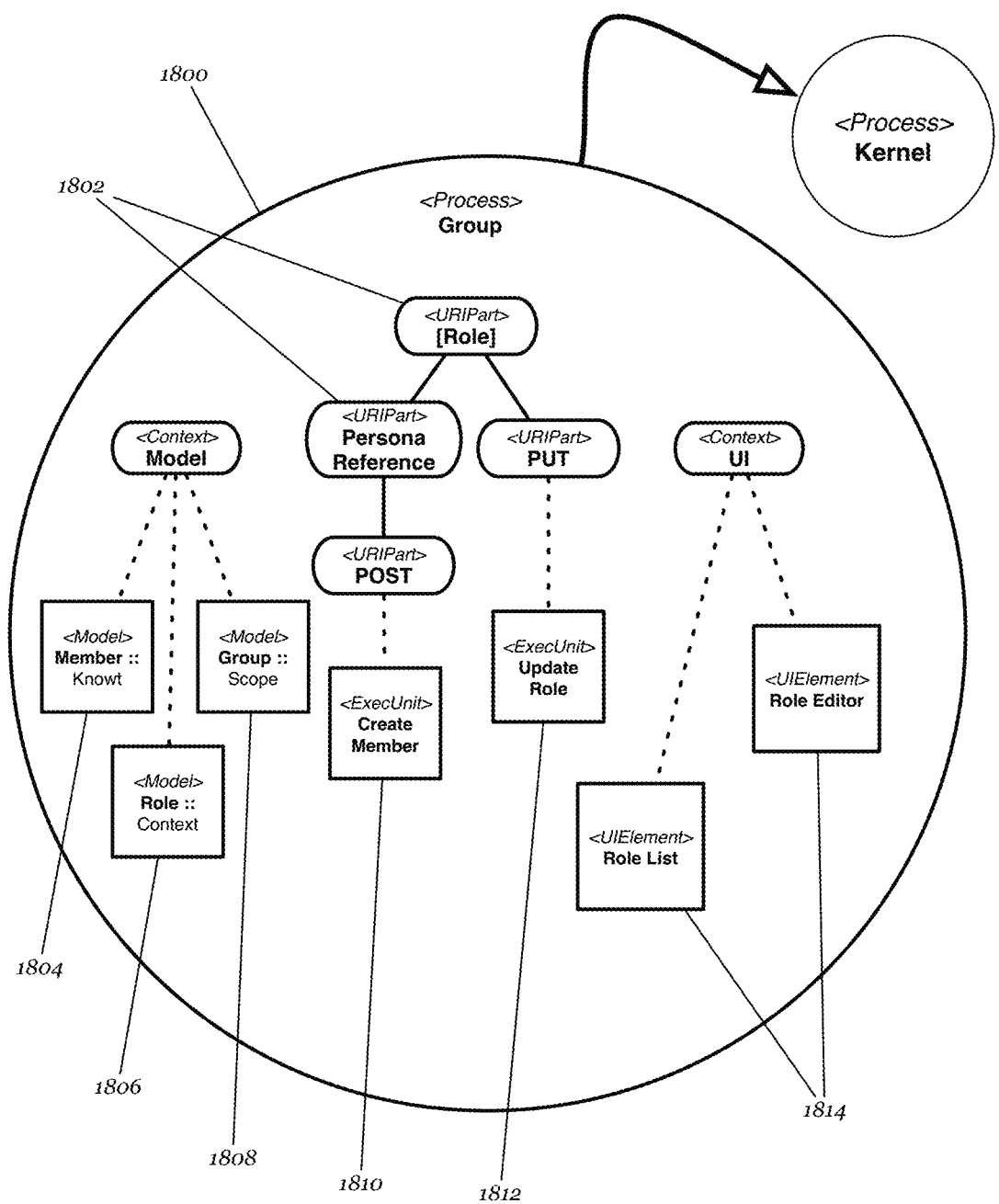
FIG. 18 illustrates the Group Process.
Figure 19:
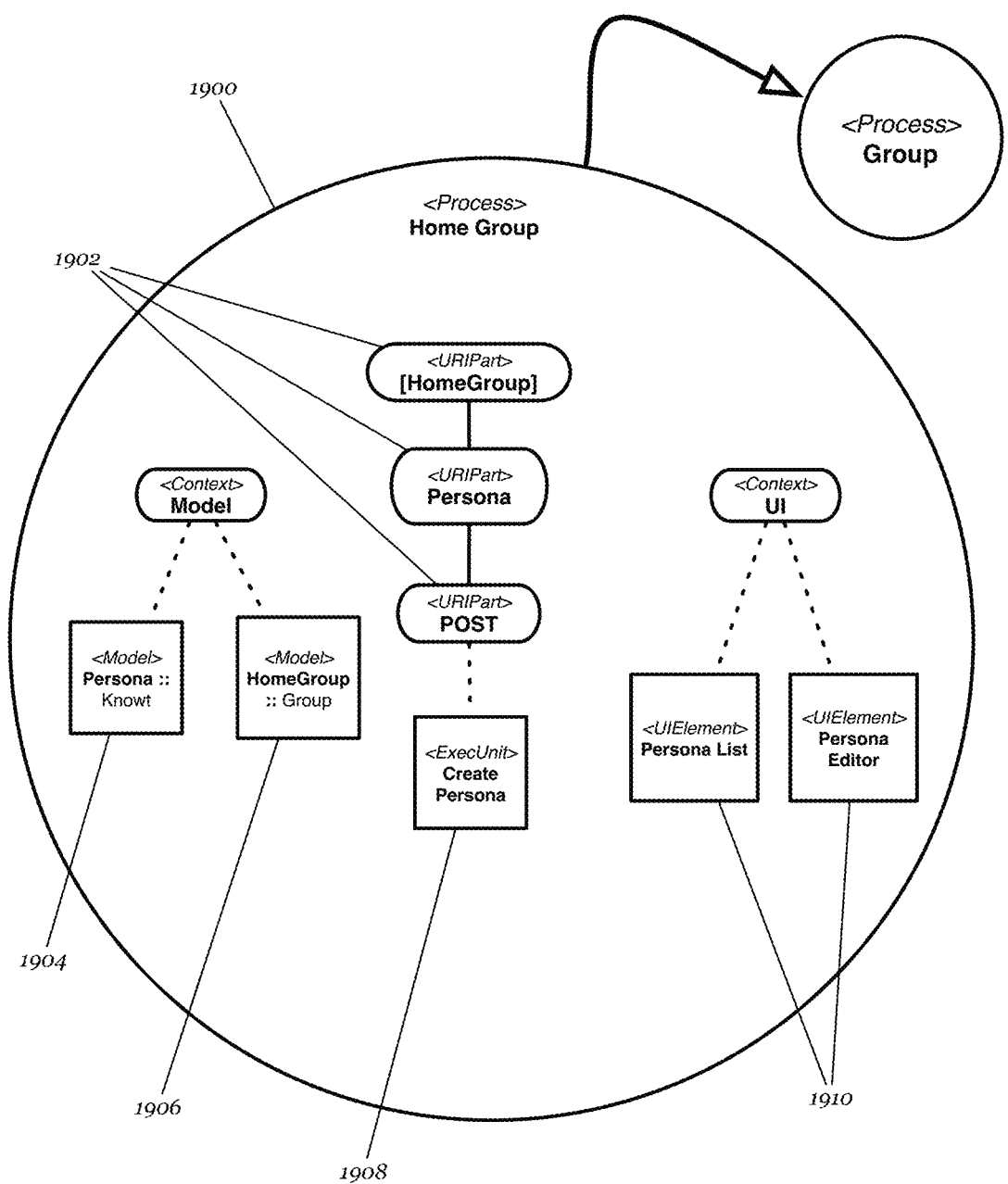
FIG. 19 illustrates the Home Group Process.

This iteration defines the means by which user identity is managed, and how users are organised within the system. As depicted in FIGS. 18 & 19, two new Processes—the Group Process (1800) that extends from the Kernel Process, and the Home Group Process (1900), which extends from the Group Process are defined.

The Group Process (1800) defines additional Model objects:
  Group extends Scope (1808)
  Role extends Context (1806)
  Member extends Knowt (1804)
  Invite extends Knowt (not shown in FIG. 18)
  Additional Model objects will be introduced in subsequent iterations.

The Home Group Process (1900) also defines additional Model objects:
  Home Group extends Group (1906)
  Persona extends Knowt (1904)

Figure 20:
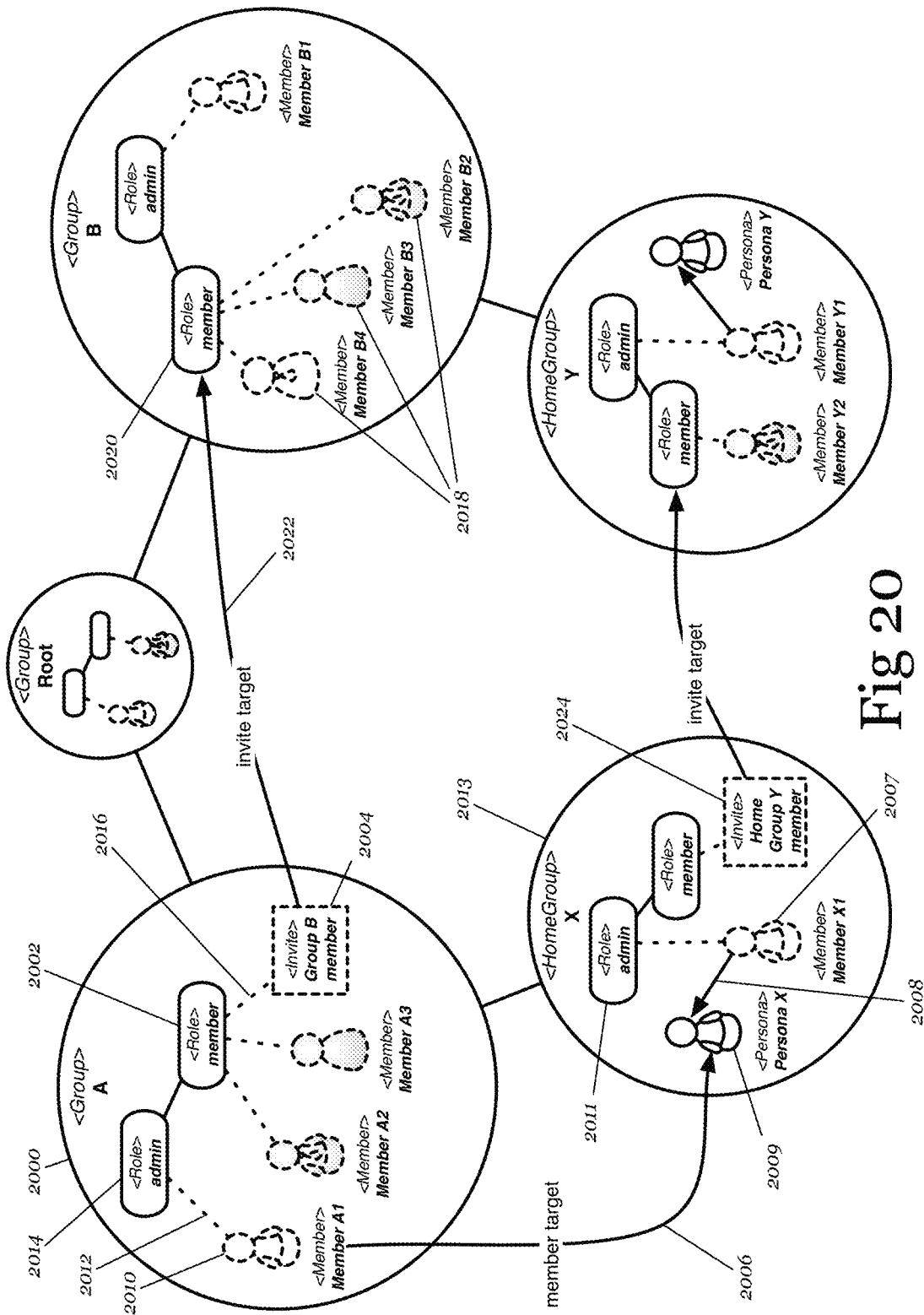
FIG. 20 illustrates HomeGroup, Persona, Role, Member an Invite relationships.

It is especially important to note an instance of the Home Group Process is both a Home Group and a Group through the standard inheritance and instantiation mechanisms already outlined. A Persona is the system representation of an end user (also referred to from now as simply user). Every Persona has one Home Group, and every Home Group has one Persona. FIG. 20 shows a possible manifestation of the Group and Home Group structures described.

It is useful to consider the concept of Unix groups and the common practice for Unix users to be given a home folder. In Unix, a group is a list of users; a user may belong to many groups; every file is associated with exactly one group. In a broad sense, these basic elements are true of the system described. Personas are members of their Home Group, and may become members of other Groups. As will be seen shortly, it is also the case that every Knowt in the system is associated with exactly one Group that is the Knowt's owning Group. There are, however, a great many differences between the Unix group mechanism and the system described. For example in the system described, a Group is an instance of a Process, has a RESTful API and a user interface. Also, in the system described a Group is a first-class part of the 'file system' rather than meta-data.

Note that Personas, while being Knowts, are generally shown in the figures using a symbol representative of a person, rather than the usual square. This is for understanding Personas as representative of users within the system, and the meaning of the diagram would be unchanged if Personas were represented using the usual square of other Knowts.

An instance of Member model definition (1804) from the Group Process (1800) contains a reference (2006, 2008) to a Persona. This identifies that the Persona is a member of the Group containing the Member Knowt. Member Knowts (2010) are indexed (2012) under Roles (2014). Note that Members, while being Knowts, are generally shown in the figures using a dashed outline of a symbol representative of a person, rather than the usual square. This is to aid understanding a Member as representative of a Persona, which is in turn representative of a user within the system.

Note that each Persona (2009) has a corresponding Member (2007) record indexed by the 'admin' Role (2011) in their Home Group (2013).

An instance of the Invite model definition from the Group Process (1800) contains a reference to a Role instance in another Group. Invite Knowts (2004) are also indexed (2016) under Roles (2002). This identifies that all indexed Members (2018) of the Role (2020) that is referenced (2022) by the Invite (2004) are permitted to join the Role (2002) under which the Invite is indexed (2016). A Member cannot be created in a Group without a qualifying Invite.

As can be seen from the previous discussion, a Role is used to identify Member sets within a Group. Roles operate hierarchically—in Group A (2000), a Member (2010) of the 'admin' Role (2014) is also considered to belong to all child Roles. In this case, Member A1 (2010) belongs to both the 'admin' and 'member' Roles (2014 & 2002 respectively). Every Group should define the 'admin' and 'member' Roles at a minimum. Groups are also able to arbitrarily define additional Role hierarchies via the REST API of the Group Process. This allows a Group to form arbitrarily complex organisations among its Members.

In FIG. 20, it can be seen that all Members of Home Group Y have been invited to become Members of Home Group X. It is important to note that the set of invited Members changes dynamically. For example, if a new Member were to be created in Home Group Y, they would automatically be able to join Home Group X by virtue of the Invite (2024) indexed in the 'member' Role in Home Group X.

Note that because the Group Process governs the behaviour of a Group, different versions of this Process may provide different functionality. This variance in Group behaviour improves the utility of the system, and is one of the key outcomes enabled by the design. Through this mechanism, complex and variant Group behaviours can be realised. This flexibility is an outcome unique to the system described. For example all Facebook groups operate using the same underlying code, and this delivers a poor representation of real-world group behaviour where the interactions and operations can vary quite markedly. Instead of the system vendor choosing the operational nature of the group, the system described allows users to make that decision.

Also of importance is that the system described delivers an alternative to the common social mechanism of explicitly identifying relationships with others. For example, Facebook and Twitter require that a user identify other users to whom they wish to be related. The system described achieves these relationships implicitly when the Persona becomes a member of a Group. The Persona is related to other Personas according to the relationships of the Group Members through the mechanism defined by the governing Group Process. Extremely complex relationship graphs can be constructed by the mechanism of joining a Group, modified through the mechanism of varied Roles, and destroyed by leaving Groups. The system described delivers a far more capable model of human social relationships and their meanings—one that is much more able to represent intricate complexity at the same time being simpler and more natural for the user.

Note that when an authenticated user principal arrives at the system and does not have a corresponding Home Group, the Invoker is configured to instantiate the Home Group Process to create a Home Group for the newly arrived user. The system described does not mandate any particular authentication mechanism. Authentication is the means whereby the client proves their identity to the satisfaction of the authentication provider. The system might be configured to accept authentication via an OpenID provider, or some other third party such as Facebook or Twitter. The means for achieving this are well documented by each of these authentication providers. The term 'user principal' is used here to mean the authenticated entity—this might be a human user, or another computer system.

Iteration Thirteen—Exemplary System Structure

Figure 21:
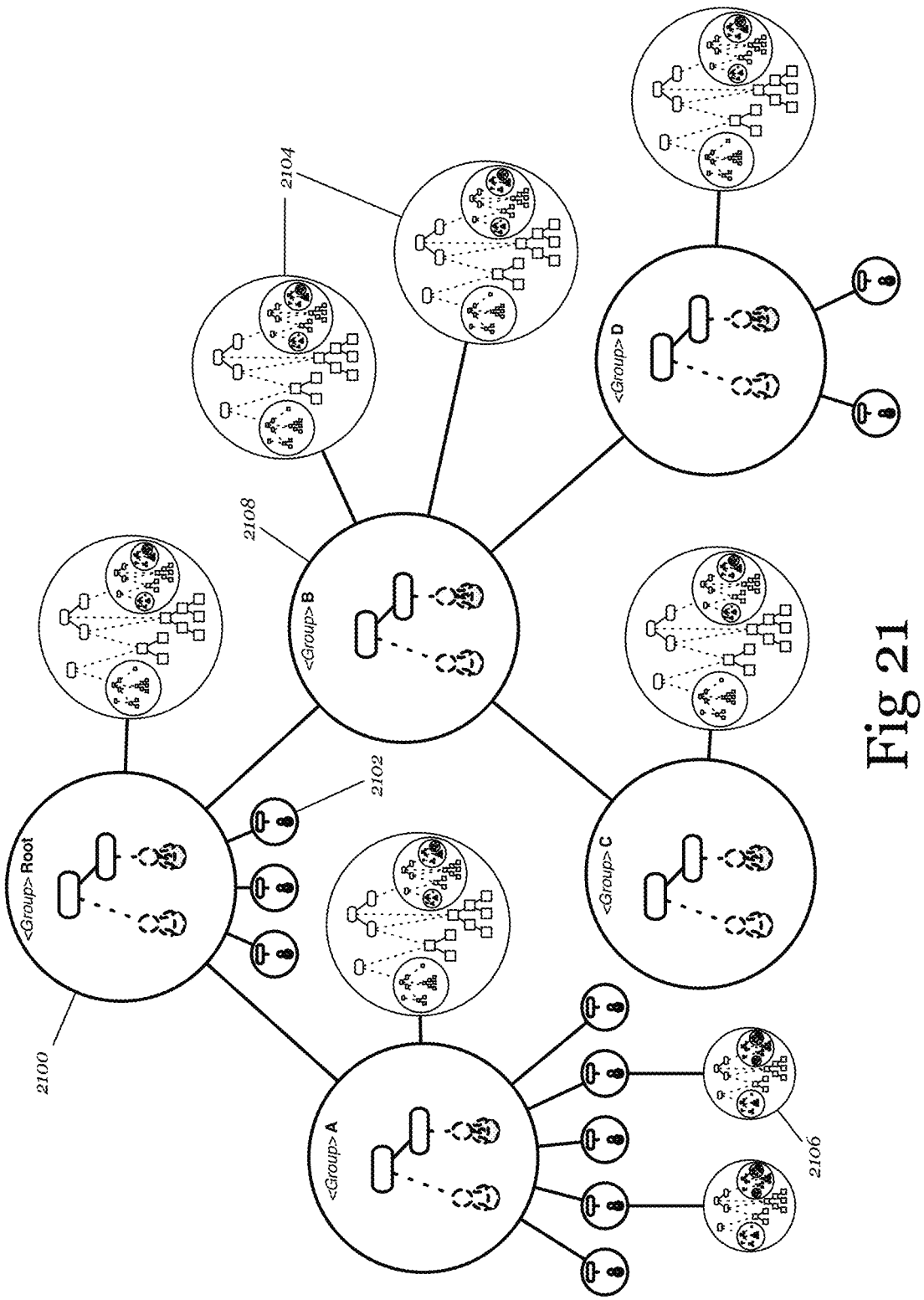
FIG. 21 illustrates an exemplary system structure.

This iteration defines an exemplary system structure using the concepts of the previous iterations. FIG. 21 highlights the structure outlined in this iteration. The intention is to show how the data structures previously described might be arranged in a coherent manner into a useful hierarchy.

As noted in the third iteration, the entire system is built from a hierarchy of Knowts (including Knowt subclasses). Every Knowt, with the exception of the root Scope, defines exactly one parent Scope in the parent_scope field defined in the Knowt class of iteration one.

The root Scope is always a Group, and called the Root Group (2100). Every Group, except the Root Group, must have another Group as its parent Scope, as referenced in its parent_scope field. Every Group's group field references itself. With this structure, a Group (2108) sits at the root of every Scope hierarchy (2104), and every group is said to own the Scope hierarchy (2104) for which it is the root—the group field of every Scope in a parent_scope hierarchy references the first ancestor of the hierarchy which is a Group (or itself if it is a Group). And alternative statement of this fact is that the group field of a scope identifies its owning Group.

A HomeGroup (2102) is a Group, and as such is also the owner of a Scope hierarchy (2106). From this perspective a HomeGroup is similar to a user home directory in the Unix operating system.

Figure 24:
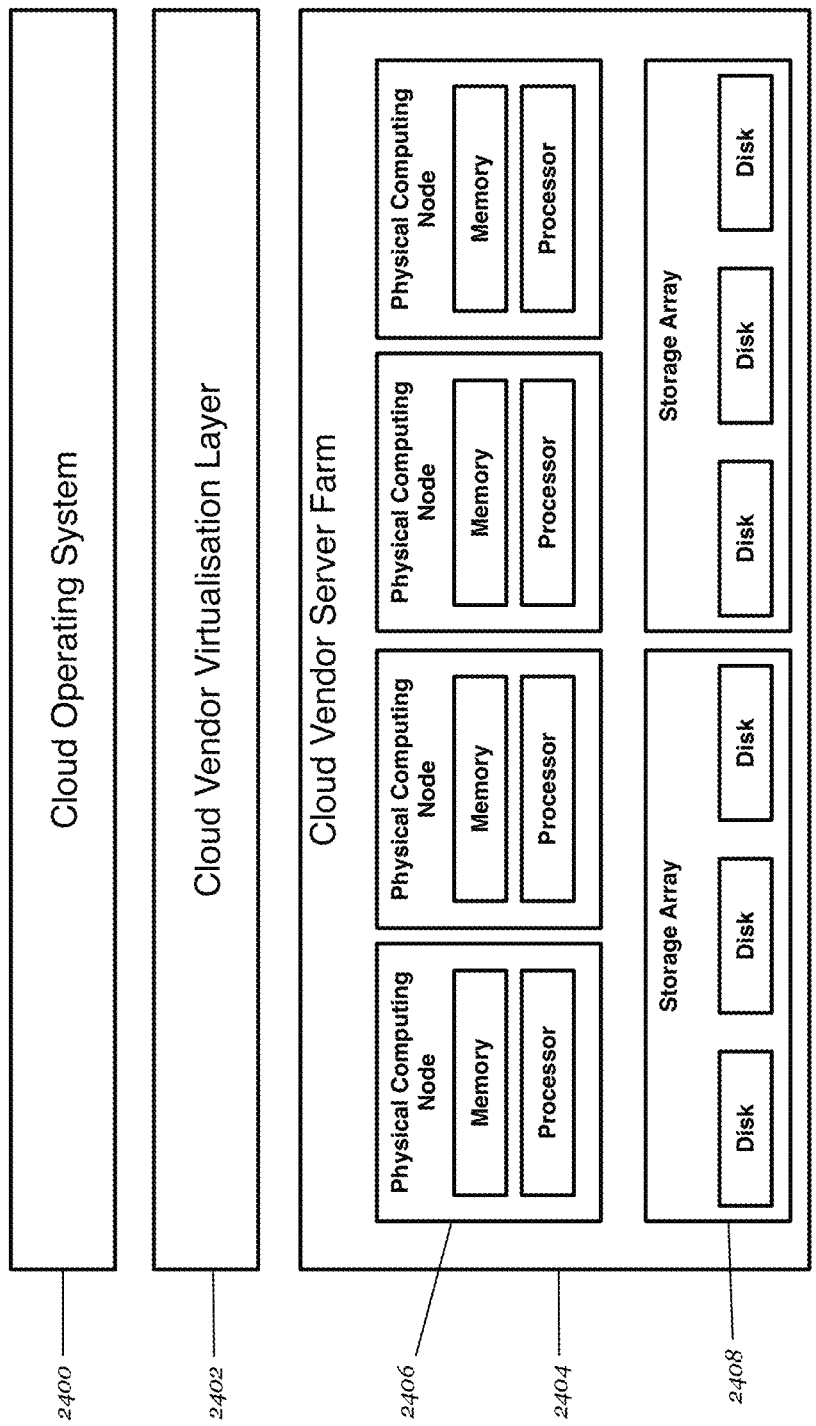
FIG. 24 illustrates the relationship of the system described to the physical hardware of a cloud vendor.

Note that in FIG. 24, all instances of the Group Process are marked accordingly. Of the remaining circles in the diagram, the smallest (e.g. 2102) represent Home Groups, while the remainder of the circles (e.g. 2104, 2106) represent the non-Group Scope hierarchies owned by the Groups and Home Groups they are attached to.

Iteration Fourteen—Process Organisation

Figure 22:
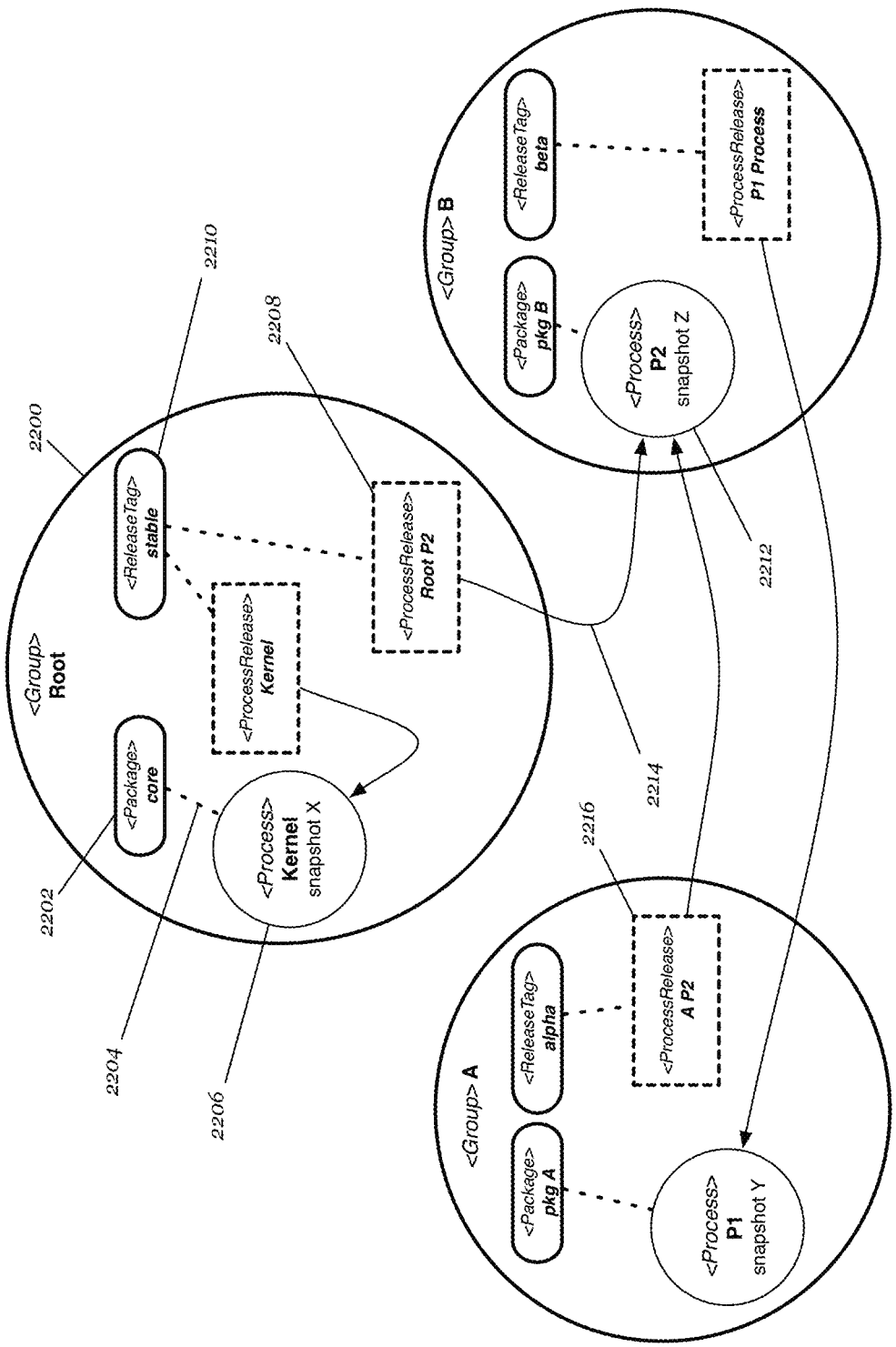
FIG. 22 illustrates process organisation within a group.

This iteration defines the means by which Processes are organised, released and located within the system. While many possible mechanisms are possible using the structures previously defined, for the system described, Groups perform these organisational functions. Three new Model types with arbitrary names are defined in a Group Process:
ProcessRelease extends Knowt
Package extends Context
ReleaseTag extends Context
For the system implementation described, the parent_scope of a Process must be a Group. A Package (2202) is used to index (2204) a Process snapshot (2206) within a Group (2200). A Package may contain multiple Process definitions, and will contain all the snapshot versions of each of these. The Root Group defines a core Package (2202) that contains the key system Processes—the Kernel Process, Process Process, Group Process and HomeGroup Process. FIG. 22 shows a snapshot version of a Kernel Process (2206) being indexed (2204) by the core package (2202).

Before a Process may be instantiated, it must be released. In the implementation described, a Process must be released to a Group, and may be released to many Groups. A Process need not be released to its owning Group, but it may be. Once released, a Process may be located and instantiated. FIG. 22 also shows the structure of a Process snapshot (2212) that is released in both the Root Group (2208) and Group A (2216), but not in Group B, which owns the Process itself.

Prior to releasing a Process, a snapshot version of the Process must be created as outlined in iteration ten. The snapshot version of the Process is released by creating a ProcessRelease entity (2208) in the Group (2200) into which the Process snapshot (2210) is being released, and is indexed by a ReleaseTag (2210). A ProcessRelease contains a reference (2214) to the snapshot version of the Process (2212) to be released. As with all system requests, a user must be authorised to perform the action. In this case a user must be authorised to [ReleaseTag]/ProcessRelease/POST. Preferably a Group will already have a set of ReleaseTags defined, however if this is not the case then one must be created before the Group can be used for a ProcessRelease. Iteration sixteen provides further details of the authorisation mechanism.

As noted later in the description, the user releasing the Process may set pricing for various usage scenarios of the released Process. This data is contained in the ProcessRelease entity, and provided when the ProcessRelease entity is created. The primary usage scenarios are 1) Direct Instantiation—where an instance of the Process is created directly, 2) Aggregated Instantiation—where the Process is instantiated because it is configured as an aggregate of another Process & 3) Inheritance, where the Process is identifies as the super Process of another Process. All of these mechanisms can be allowed or disallowed independently of the others and at different price points.

When a user of the system wishes to create a new Process, they must instantiate a Process Process. Instantiation of the Process Process, like all Processes, requires a ProcessRelease for that Process to be available to the user. An instance of the Process Process is a Process, and is indexed under a Package. And, as previously noted, the new Process will not be able to be instantiated until it is released.

Note that the process organisation and Process releasing mechanism is governed by the Group Process implementation for the Group in question. Different implementations of the Group Process may define different behaviour. In the implementation described, only one ProcessRelease may exist under a given ReleaseTag for a given Process. Consequently, a ReleaseTag supports only one version of a Process at any one time.

Iteration Fifteen—Migration

This iteration defines a means by which a Scope may be migrated from governance by one Process version to governance by another Process version. Often the new Process version is a version of the same Process as the old Process version, but this is not a requirement. This mechanism is extremely powerful, and allows the system to evolve as new Processes and Process versions become available. This iteration defines the following additional Model type within the Process Process: MigrationScript extends Code When a developer creates a new version of a Process, it may often specify new Models, or modify or remove existing ones. It might also change the way code determines the values to be stored in existing Model fields. Consequently the data in an instance of the older version of the Process may not be compatible with the code and model definitions in the new version of the Process. The purpose of the migration mechanism is to convert the data in a Scope from a form compatible with one Process into a form compatible with another Process.

Note that it is not a requirement that a Scope be migrated when a new version of a Process becomes available. As noted previously, a Scope is always an instance of a snapshot version of a Process, and this is read-only. From this perspective a Scope can continue to operate indefinitely without conflict using this snapshot version. Many snapshot versions of a Process may exist, and many instances of each of these may also exist.

The migration mechanism involves the creation of a MigrationScript entity within a Process. The script contained within a field of the MigrationScript entity may either convert a Scope to or from the Process that instantiated it. Consequently the MigrationScript must identify a snapshot version of a Process as either the source or the destination, while the other remaining element is implicitly the Process containing the script. Note that this means the migration scripts within a Process are included when a snapshot version is created. While not mandated, it would be expected that a Process developer would at the very least write a script to migrate from the previous version of a Process to the next version.

Many alternative mechanisms would be possible. For example, it would be reasonable to support the development of migration scripts independently of the Processes, allowing creation and maintenance of said scripts after Process release. For example it may be desirable to create a migration script between a version of a Process A's Scope instance and a version of a Process B's Scope instance after both Process A and Process B have been released. A possible implementation of this mechanism would see the creation of a ScriptRepository Process, with an instance of such residing as a child Scope of a Process. The Script Repository Process would be responsible for maintaining scripts contained within its instances.

There are many possible mechanisms for converting one data set to another, however the simplest is to support ad-hoc queries on the source data and consequent ad-hoc writes of the new data. This implementation is sufficient for the description of the migration mechanism, however in practice more advanced mapping and processing approaches are likely to be used.

At the beginning of Scope migration, a snapshot version of the Scope is created, and this is used as the source data. As noted earlier, a snapshot version is a read-only copy of the scope. In the event that the migration fails, it becomes a simple matter to restore the snapshot version, and provide rollback failure recovery.

Iteration Sixteen—Authorisation

This iteration defines a means of authorising calls to system URI. If a call is authorised, then execution proceeds according to the mechanisms previously outlined. If a call is not authorised, then an error is thrown according to the protocol specification. If that protocol is HTTP, then it is likely that a HTTP 403 Forbidden error is most appropriate.

Figure 23:
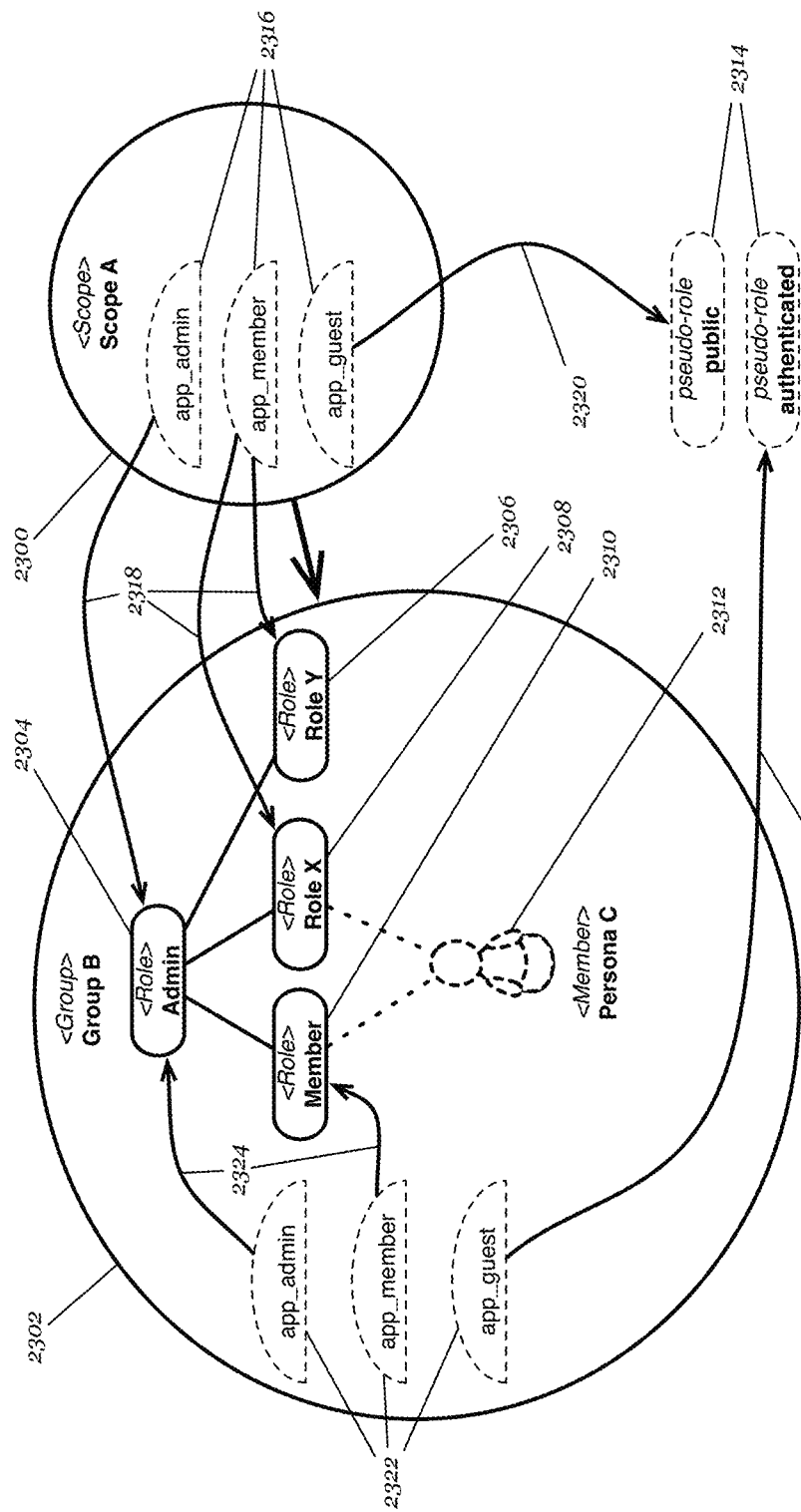
FIG. 23 illustrates the authorisation Process.

When the Resource Locator (1713) receives a URI for servicing, it identifies the target Scope for that URI as previously outlined in iteration eight. For the authorisation mechanism described, the Resource Locator requires that a Scope (2300) contain authorisation data to be used to authorise an incoming URI to that Scope. The Scope Model definition of iteration three identifies the roleMaps and roleUriPatterns attributes for this purpose. These fields are serialised dictionaries. FIG. 23 will be used to facilitate discussion of the authorisation mechanism.

For the authorisation mechanism described, the Resource Locator also requires a mechanism to identify the caller's Roles (2308, 2310) in the Scope's owning Group (2302). If the caller has been authenticated, then the Resource Locator will have also determined the user making the call, and the Persona object corresponding to that user. This can then be used to identify the corresponding Member (2312) in the Scope's owning Group (2302) if one exists. If the user has not been authenticated, or does not have a corresponding Member entity in the Scope's owning Group, then they will not have any roles in the Scope's owning Group. In practice the performance of the mechanism to determine these roles can be improved significantly by storing this data directly on the Persona object.

The Resource Locator must also determine the caller's membership of a fixed set of pseudo-roles (2314). Pseudo-roles are simply markers that indicate various calculated states of the caller. For the authorisation mechanism described, the available pseudo-roles (2314) are public and authenticated. Every caller has the public pseudo-role regardless of what other factors are present. Every authenticated caller has the authenticated pseudo-role regardless of what other factors are present.

The serialised dictionaries on a Scope contain definitions for a Scope's internal roles (2316). These definitions are marked in FIG. 23 as dashed semi-circles. The roleMaps dictionary maps (2318) a Scope's internal roles (2316) to Role entities (2304, 2306, 2308) in the Scope's owning Group (2302). For example:

roleMaps:={'app_admin':[ABC123], 'app_member': [DEF345, GHJ567], 'app_guest': ['public']}

The above definition of the roleMaps dictionary defines 3 internal Scope roles (2316)—app_admin, app_member & app_guest. Each of these is associated with an array of keys that reference (2318) either Role entities in the Scope's owning Group, or reference (2320) pseudo-roles. It can be seen that the internal Scope role app_admin is only mapped to one Role (2304) in the Scope's owning Group (2302), and the internal Scope role app_member is mapped to two Roles (2306, 2308) in the Scope's owning Group (2302). The internal Scope role app_guest is mapped (2320) to all users through the public pseudo-role. The second serialised dictionary—roleUriMaps contains sets of URI regular expression (regex) patterns that are applied to the incoming URI pattern. For example— roleUriPatterns:={'app_admin': {'whitelist': ['.*']}, 'app_member': {'blacklist': ['[Scope]/PUT'], 'whitelist': ['GET$', 'POST$', 'PUT$', 'DELETE$']}, 'app_guest': {'whitelist': ['GET$']}}

The above definition of the roleUriPatterns dictionary contains the same 3 internal Scope roles defined in the roleMaps dictionary. Each internal Scope role may contain whitelist and blacklist regex patterns. If blacklist patterns are defined, and a blacklist regex pattern matches a URI pattern in the incoming URI Type Hierarchy, then that internal Scope role is not authorised to the URI, and processing of the data for that internal Scope role is complete. If blacklist regex patterns are not defined, or no blacklist regex pattern matches a URI pattern in the incoming URI Type Hierarchy, then the whitelist patterns are checked. If a whitelist regex pattern matches a URI pattern in the incoming URI's Type Hierarchy, then that internal Scope role is authorised to the URI, and processing completes of the data for that internal Scope role is complete. If whitelist roles are matched to the incoming URI, or no whitelist roles are defined, then that internal Scope role is not authorised to the incoming URI. Processing then moves to the next role defined in the roleUriPatterns dictionary. Note that by matching the URI Type Hierarchy, polymorphism is achieved in the regex patterns. For example, the regex pattern '[Scope]/PUT' will match an incoming URI of '[Project]/PUT', because '[Scope]/PUT' is in the URI Type Hierarchy of '[Project]/PUT'. This is because the Project Model defined in the exemplary Scrum Process previously described inherits from the Scope Model defined in the Kernel previously described. See iteration nine for more details of the polymorphic nature of the RESTful URI structure. At the conclusion of processing the roleUriPatterns dictionary a subset of the internal Scope roles has been established that is authorised to the incoming URI. If that subset is empty, then the caller is not authorised to call the URI and an appropriate error is returned according to the protocol. Note that in practice an empty set of internal Scope roles at this point would be unexpected, because the app_admin internal Scope role should have access to all URI for the scope ('.*' is a regex pattern that matches any URI). It is therefore expected that the minimum set at this point will contain app_admin. Note that a regex pattern of 'GET$' matches any URI that ends with 'GET', and given an implementation of the normal understanding of this HTTP method, will provide full read access to the Scope.

Having determined the set of authorised internal Scope roles, it is now a simple matter to use the roleMaps data to identify the authorised Roles in the Scope's owning group, and/or the pseudo-roles that are granted access. For example, if app_guest were in the set of authorised internal Scope roles, then all users would be authorised to call the URI, because the authenticated pseudo-role is authorised. If only the app_admin internal Scope role were authorised, then only Members of the owning Group Role identified by the key 'ABC123' would be authorised. A mechanism that bears some similarity to this is the J2EE application deployment task of mapping system roles to application roles. The J2EE system recognises the user principal as the authenticated entity, which serves a similar purpose to the Persona structure. While there are some similarities, the J2EE system does not use URI regex patterns or RESTful URI as part of the authorisation mechanism—nor any of the constructs of the system described, such as Scope, Process, Group, Resource Locator, or the relationship between said constructs. As such, realising an authorisation mechanism in such an environment is a significant departure from the prior art.

With the roleUriMaps value defined above, and the settings of FIG. 23, all users will have read access to Scope A (2300), because every user has the guest pseudo-role, the guest pseudo-role is mapped (2320) to the app_guest internal Scope role, and app_guest has the regex pattern 'GET$'. Similarly, Persona C (2312) will have the access defined by the app_member regex patterns, because they are a Member (2312) of Role X (2308) in the Scope's owning Group (2302).

Note that the blacklist entry for app_member in the roleUriMaps dictionary denies access to updates of the Scope entity itself. Since authorisation data is maintained on the Scope entity, the implication is that only the app_admin can modify authorisation data. It is expected that additional internal Scope roles may be added at runtime to provide different authorisation capabilities.

Also shown in FIG. 23 is the fact that because it is a Scope, identical logic applies to a Group. A Group is its own owning Group, and thus maps (2324) its internal Scope roles (2322) to its own Role entities (2304, 2310). In the case of this Group (2302), the authenticated pseudo-role is mapped (2326) to the Group's internal app_guest role, so only authenticated users will get the privileges defined for this internal role in the Group's roleUriPatterns dictionary (not shown). By these mechanisms the Members of a Group are authorised to all Scopes owned by the Group.

Note that the Scope Model containing the authorisation data structures is defined within the Kernel Process, and those data structures are interpreted for authorisation purposes by the Resource Locator (1713) that resides in the Process Process (1712) of which said Kernel Process is an instance. Consequently, the form of the data structures defined in said Kernel Process are constrained by the requirements of the Resource Locator in the governing Process Process. It is therefore the case that different implementations of an authorisation mechanism may arise in the system. Indeed, it is expected that in a mature realisation of the system described, many different implementations may be in operation at the same time. This iteration describes an exemplary authorisation mechanism.

In practice, it is likely to be compulsory for a Scope to define the internal app_admin role as a minimum, and give this role full access using the regex '.*' as described. It is also likely that this internal Scope role must remain mapped to at least one Role in the owning Group. Failure to enforce this could result in the Scope being inaccessible, with no authorised means to make changes that provide access.

Iteration Seventeen—A RESTful Cloud OS

This iteration defines the means by which the concepts in the previous iterations are applied to create a multi-user operating system (2400) running on a cloud-computing platform (2402, 2404) such as Google App Engine. The basic premise is that the system data store residing in the cloud vendor's storage array (2408) must be initialised with a pre-defined set of data that is sufficient to deliver its operational capabilities. This is a requirement of all operating systems—they must be installed prior to becoming operationally viable. Secondly, the system must be able to transition from this inert data set to a running system. In a traditional desktop operating system this is the mechanism commonly referred to as the bootstrap. Consequently, this iteration describes the installation and bootstrap mechanism.

Figure 25:
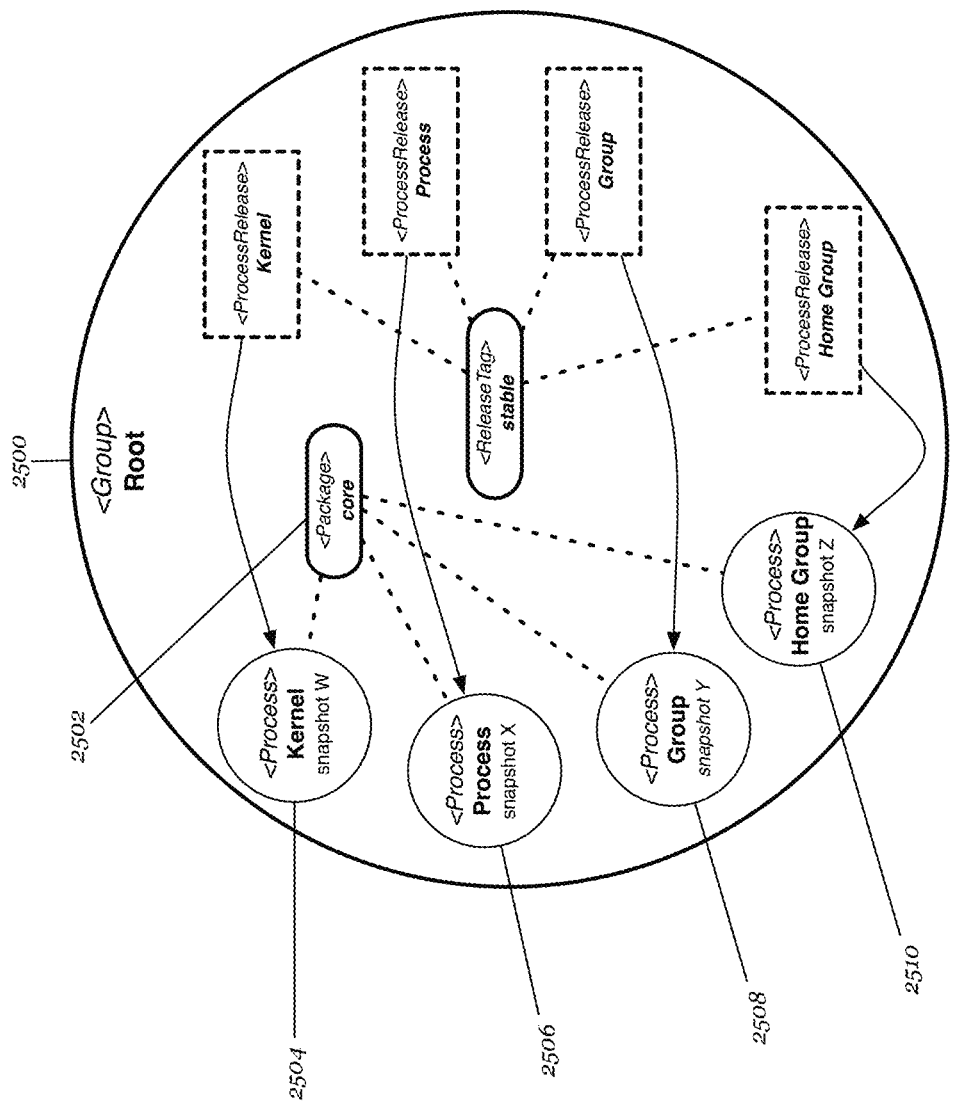
FIG. 25 illustrates the initial data which must be present in the system data store to deliver a working system.

For installation the system requires a significant amount of data to be present in the data store before it can bootstrap to a running system. This might be achieved using a standard data store upload script. From a logical perspective, the minimum requirement is implementations of the Kernel Process (including an Invoker implementation) and the Process Process in order that requests can be handled, new Processes may be created, and existing ones maintained, however for the system described, the intention is to deliver the basis of the exemplary system structure of iteration thirteen. This basis is shown in FIG. 25, and consists of the Root Group (2500) containing implementations the Kernel Process (2504), Process Process, (2506) Group Process (2508) and HomeGroup Process (2510) indexed under the core Package (2502). Once the data is installed into the data store, the Request Processor may be deployed manually. As noted earlier the Request Processor is responsible for handling incoming requests and loading the Invoker from the specified Kernel Process implementation. An additional requirement of the Invoker implementation is the ability to create instances of the HomeGroup process for new users—i.e. to create their Home Group. Additionally, the Invoker should be configured to create an Invite in the Root Group admin Role for the first Persona in the system. This is similar in Unix to the special processing required to create the root user. This mechanism represents one possibility for handling the creation of the first HomeGroup. Another, more secure mechanism would be to deploy the Request Processor with a hard coded user identifier, and only creating a Root Group admin Invite for that user's Persona.

As noted the bootstrap mechanism involves the Request Processor loading the Invoker implementation from the Kernel Process version that has been explicitly configured. It is important to note however, that while a cloud computing platform abstracts (2402) the underlying hardware infrastructure (2404) a great deal, it is still the case that an application running in such an environment does so on a collection of physical computing nodes (2406)—the higher the application load, the more nodes in the collection. Generally, each of these nodes is identical in function, with the cloud platform distributing work to the nodes in order to handle the load of the system. This means that every node in the system has an instance of the deployed Request Processor in memory, and each must load the specified Invoker implementation. In the system described, each of these nodes will have a need to load code from the data store contained in the physical storage array (2408) of the cloud vendor in order that it can service its request (iteration eight describes the request handling mechanism, while FIG. 17 outlines the mechanism). The required code could be loaded from the data store for each request, however in practice this performs poorly and in-memory caching is required. As a result of this, requests to a node may require the system to load the code required to service that request, or the code may already exist in the cache. The mechanism for loading the required code and storing it in cache represents a secondary bootstrap mechanism of the system. For the system described, each request must work from the key contained in the request and establish a sequence of code executions using the mechanism previously described. A prudent caching mechanism would be to cache the data loaded to service the current request. Over time a physical computing node will build up a cached capability to service a progressively larger and larger set of requests directly from the in-memory cache, dependent upon the specific requests actually received by that physical computing node.

With these mechanisms, and the structures outlined in the previous iterations, an operating system is made available which exposes a RESTful API, offers a development mechanism, and is able to provide authorised access to its data.

Iteration Eighteen—Awards & Reputation

This iteration defines a means by which Knowts within the system may obtain awards and a reputation metric. These metrics are useful to highlight to users the value of the data they are operating on, keeping in mind that in a massively multi-user system, a great deal of data is generated by other users. This mechanism is also useful as a rewards based incentive mechanism to drive adoption and use of the system. This iteration defines a new Model definition for the Process Process:

AwardSpec extends Code

This iteration also defines a new Model definition for a Kernel Process:

Award extends Knowt

Rating extends Knowt

An AwardSpec defines a piece of code that calculates if a specific Award entity should be created and associated with a Knowt or Knowts. Any Process may define any number of AwardSpec entities, and each corresponds to an Award that may be earned within an instance of that Process.

It is important to note that while an Award will often be associated with a Member of the owning Group, this is not required. An Award may be associated with any Knowt. For example if a Process defined a Document Model, it might be associated with a popularity award when a certain number users had requested to view it.

An AwardSpec is executed by observing URI as they are called on a particular Scope. As noted, an incoming URI maps to a Scope and the Process hierarchy of the Process that the Scope is an instance of. For the purpose of this description, the behaviour of an AwardSpec is triggered by the Invoker (1708) whenever a URI is received that matches the configuration of the AwardSpec. In a real system, a more complex mechanism that performs Award calculations asynchronously rather than synchronously is likely to be used.

It is expected that the configuration of a URI match pattern in the AwardSpec is able to operate in a polymorphic fashion. Generally this would mean that matching any pattern in the unresolved URI type hierarchy of the request (as defined in iteration nine) would cause the execution of the AwardSpec code.

When an AwardSpec is executed, the Invoker passes a copy of itself to the code that is executed, and that code can make further queries to determine if an Award should be created. The Invoker also makes the calling user available to the AwardSpec code.

Should an AwardSpec determine that an award should be granted, an Award object is created in the Scope that is an instance of the Process defining the AwardSpec. A Process UI might be expected to display the Awards associated with a Knowt when the Knowt is viewed.

An Award may be associated with a Member from the owning Group. This is analogous to the user receiving an Award for activity within the system.

An AwardSpec may run many times before creating an Award, if ever. The execution of an AwardSpec code is performed in reaction to an incoming URI, and will not necessarily result in the generation of an Award. For example, a user may need to perform 100 updates in a Scope to receive an Award, in which case the AwardSpec code would run 100 times in order to generate the award. Such an AwardSpec might be configured to execute in response to the URI pattern 'PUTS', which is a regular expression that would match any URI using the HTTP PUT operation.

Every Knowt also has a reputation counter as an Integer field. A Knowt's reputation value is influenced by the following 1. The Awards it has associated with it—awards may specify a conferred reputation amount.

2. User Rating—users of the system have the capacity to rate individual Knowts, but may only register one rating for each Knowt, although that Rating may be changed, or removed and re-registered any number of times. When a user rates a Knowt, a Rating entity is created within the Scope containing the Knowt being rated, and referencing the Knowt and the Group Member leaving the Rating.

3. The reputation of the Scope containing the Knowt—this is a recursive device—a Knowt in a Scope with high reputation may have its own reputation enhanced by being present in this Scope, or reduced in the situation where the Scope has poor reputation. As an example, consider a Group that contains a Scope that contains a Knowt. The reputation of the Group influences the reputation of the Scope, which influences the reputation of the Knowt. In a real world example consider a Group consisting of Nobel Laureates—such a Group might have a high reputation. Scopes within this Group also have their reputation enhanced by existing within this Group.

4. The reputation of its children—this is also a recursive device, and works with the previous mechanism. Consider again the Group that contains a Scope that contains a Knowt. The reputation of the Knowt influences the reputation of the Scope that influences the reputation of the Group. As a real world example, consider a Document Knowt that contains a highly renowned essay—such a Knowt might have a high reputation. The reputation of the Scope containing the Knowt is enhanced because it contains such a well-regarded document.

Other mechanisms may also be used, such as the age of a Knowt.

Group Members are Knowts, and as such have a reputation value that is influenced via the same mechanisms as those just outlined. A Member of a Group with high reputation has their reputation enhanced. This dynamic is very powerful—it is in the interests of a Member to enhance not only their own reputation, but also the reputation of the Group. Conversely, it is in the interests of the Group to contain Members with high reputation.

By this mechanism, much other useful behaviour may be realised. For example, a Process has a reputation, and a user may consider this factor when choosing to instantiate the Process. A Group containing a highly reputable Process will have its reputation enhanced.

A Persona may have many corresponding Group Members. A Persona additionally has its reputation influenced by the reputation of each of its corresponding Group Members. Consequently, higher reputation Members result in a higher reputation Persona.

Iteration Nineteen—Financial Systems & Marketplaces

This iteration defines a means by which financial transactions are enabled within the system. For this purpose, the Group is considered a store of funds, as well as both a source and destination for the movement of funds. This iteration identifies the following additional Model CreditAccount extends Knowt An internal currency representation, called credits, is used within the system, with a corresponding exchange rate to each real-world currency based on that currency's real-world valuation. One real world currency (for example US dollars) is used as the baseline for other currency calculations. Within the system, income, expenditure and pricing are expressed in credits. Every Group has at least one CreditAccount entity, which stores a credit balance. The system is described where each Group is configured with a single CreditAccount. When income and expenditure of a Group is discussed, it is understood that this involves the modification of the credit balance on the configured CreditAccount.

A CreditAccount may be associated with a mechanism via which credits are purchased. Such a mechanism may be an account with a web payment system such as Paypal™, or a registered credit card to be used via a payment provider. Other mechanisms may be supported. These mechanisms represent the means by which credits enter the economy. A CreditAccount may also be associated with a mechanism for the conversion of credits to real-world currency. Such a mechanism might be a web payment system such as Paypal. Other mechanisms may be supported.

A suitably authorised Member of the parent Group may configure a sub-Group to defer costs to the parent Group.

Preferably, each Group is billed periodically for the resources it consumes. Resources fall into one of two categories: 1) physical resources such as those charged by the cloud vendor, 2) internal costs such as those levied for owned Process instances according to the pricing set by Process developers when they release a Process. The Group administrators must configure the CreditAccount from which payment will be made.

The Root Group is configured to receive credits for resource-based billing. When the organisation or individual deploying the system described uses real-world currency to pay the cloud vendor for resource usage, an equivalent value in credits is removed from the Root Group. The organisation or individual deploying the system described must also set up a merchant account to receive the funds for credit purchase by Groups.

A Group may charge its Members a percentage of its costs, including charging above costs to make a profit. To charge Members, a Group may configure some or all of its Roles to levy a percentage of its costs. This amount is divided among the Members of each Role, and drawn from the Home Group corresponding to the Member. Consequently, a Group may receive sufficient income from its Members to cover its costs, or even make a profit. Conversely a Group may pay its Members using a similar mechanism—Roles are configured to deliver a fixed number of credits to be divided amongst the Role's Members. These payments are made to the Home Group corresponding to the Member. Consequently a Group's costs are not limited to the resource costs previously mentioned—they may include payment to Member's Home Groups. Different Group processes might implement many other mechanisms—for example a Group Process may support petitioning its Members for funds voluntarily given, or charge Members to use specific Process instances. It is expected that a Group Process that requires payment by its Members will sanction Members that are unable to pay for their membership. Such sanctions might include loss of reputation, undesirable awards or loss of membership.

Regardless of the mechanisms by which a Group gains its credits, a Group must have a sufficient credit balance to pay its periodic billing cycle. Should it violate this requirement, the Group will enter a state of limited operability. In this state, administrators will be permitted to configure payment mechanisms, or to add credits via those mechanisms, such that sufficient credits to pay an outstanding bill will reopen the Group. The system will penalise the Group reputation for payment failure. It is expected that if a Group fails to pay Members as configured, it will be the Member's responsibility to petition the Group administrators for payment or choose to leave the Group.

As with all operations, operations on the CreditAccount entity may only performed by authorised Members of the Group.

As noted in iteration fourteen, a suitably authorised user may release a Process snapshot to a Group via the creation of a ProcessRelease entity. The ProcessRelease entity is configured with the pricing structure set down by the developer at the time of the Release. A Process may be released to multiple Groups in this manner. This mechanism allows for many Processes to be released to many Groups, and thus Groups are marketplaces for Processes.

A Group may levy a charge for listing a Process in their marketplace. This charge might be a one-off listing cost, or a percentage of the periodic income earned by each instance of the Process. Other mechanisms for extracting marketplace fees are possible.

This marketplace mechanism of Groups bears some similarity to the 'App Store' models introduced by Apple for their iPhone and Google for their Android mobile operating system. However the system described may contain many such marketplaces through the release mechanism described, since there may be many Groups. This allows for competition between marketplaces and is a significantly different mechanism than those in the prior art. Competition between marketplaces drives marketplace vendors to work in the interests of the customer, which in this case is the Process vendor.

Iteration Twenty—Developer Compensation

This iteration defines a Process monetisation mechanism that leverages the elements of the system previously outlined, especially the mechanism of Process inheritance. Process monetisation provides a means by which developers of Processes may earn credits for the use of their software.

A problem that exists in the software industry today is the lack of compensation received by many developers of commonly used software components and packages. Often these developers produce open source software that is incorporated into commercial applications for the sole monetary benefit of the commercial application vendor. The mechanism presented in this iteration delivers a developer the opportunity to continue to produce open source software that can be used freely by others, but receive monetary compensation when their product is used for a commercial application.

Figure 13:
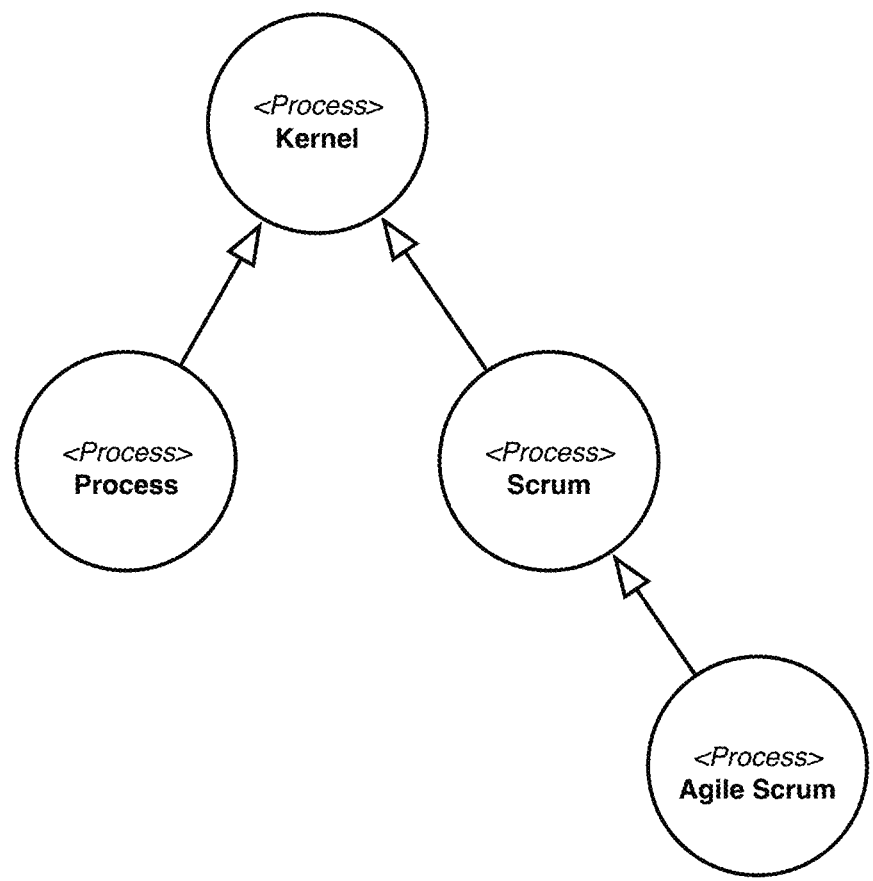
FIG. 13 illustrates an example process inheritance hierarchy.

Considering a Process inheritance such as that defined in FIG. 13, it might be the case that one Group of developers produced the Kernel Process, another the Scrum Process, and yet another the Agile Scrum Process. In simple terms, hierarchical compensation is a means by which the developers of the Scrum Process would receive a share of any revenue generated from the Agile Scrum Process, and indeed, the developers of the Kernel Process would also receive some of that revenue. Hierarchical compensation refers to any and all specific mechanisms that leverage Process inheritance in this way.

This kind of mechanism is not possible in software today, because its use requires the following elements of the defined system:

Process inheritance—no such application inheritance exists in the prior art;

Maintenance & Development of Processes forming part of the runtime environment of the system; and Process instantiation being a runtime mechanism in an environment where it is possible to bill at a fine grained level—e.g. cyclic billing for an instance of a Process.

When a ProcessRelease is created, the user performing the release defines the costs associated with an instance of that release of the Process. The user may define that there are no costs associated (i.e. the Process is free to use), provided that their Process does not incur costs associated with scenario 2 or 3 below. A Process developer must set pricing sufficient to cover these costs. As described in iteration fourteen, there are 3 main usage scenarios for a Process—

1) Direct instantiation by a user from the Group. In this scenario, the user releasing the Process may set a one off charge for the instantiation, a flat periodic subscription cost, or a per-user periodic subscription cost. Other mechanisms may also exist. Note that this Process may incur costs for the use of other Processes via any one of the following two scenarios. Consequently the instantiation cost of a Process will need to be, at a minimum, sufficient to cover these.

2) Inheritance by another Process. In this scenario, the user releasing the Process may specify any of the specific costs from the previous point, as well as a percentage amount of the income of the sub-Process. In the final situation, if the sub-Process is free to use, then the inherited Process would also receive no income.

3) Aggregation by another Process. In this scenario, the user releasing the Process may specify costs in the same manner as for scenario 1. It may be in the user's interests to set different pricing for aggregated instantiation versus direct instantiation, in order to provide incentives for other Process developers to aggregate their Process.

Compensation for a developer's work can thus be obtained in ways other than direct purchase. The user may restrict use of the Process Release to as few as one of the above mechanisms.

Another mechanism that could be considered is for each Process vendor to value or rate their work on a standard scale (1 to 100 for example). With such a metric the price set on the release would be divided proportionally. Yet another mechanism would be for the value metric to be determined by other users—a Process considered more valuable by users will earn more revenue.

Iteration Twenty One—Multiple Process Inheritance

This iteration defines a mechanism of multiple Process inheritance—the ability of a Process to inherit from multiple other Processes, providing the facility to combine the elements of each super-Process, including UI components, Model, RESTful URI and ExecUnits.

Figure 26:
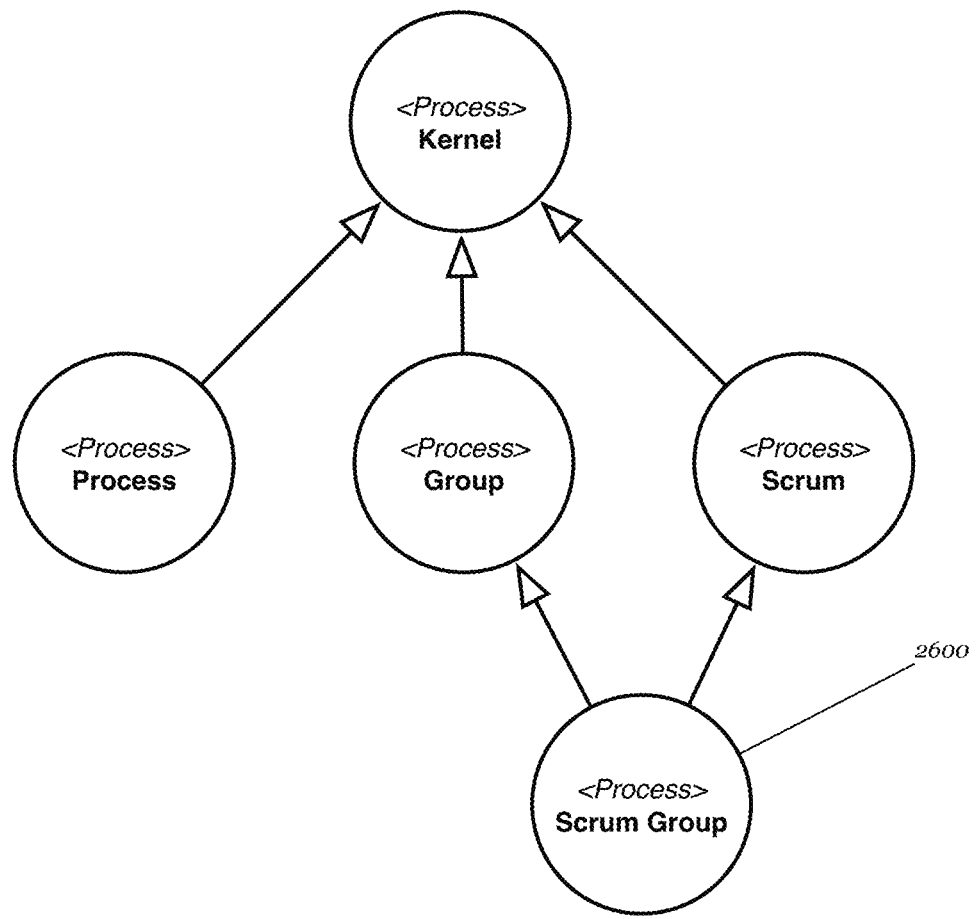
FIG. 26 illustrates a possible multiple Process inheritance scenario

There are a few differences between single Process inheritance and multiple Process inheritance. FIG. 26 shows a hypothetical Scrum Group Process (2600) that inherits both the Scrum Process and the Group Process. Such a Process would inherit the Model of both the Scrum Process and the Group Process, the UI components of both, the RESTful URI of both, and the ExecUnits of both.

The primary issue with multiple inheritance in any programming construct is the 'diamond problem'. Looking at FIG. 26, if both the Group Process and the Scrum Process provide an implementation for [Context]/Knowt/POST, then it is necessary to provide a means for determining the URI Type Hierarchy, and then the Resolved URI Type Hierarchy (see iteration nine)—should the Group Process implementation or the Scrum Process implementation be called first, and should the remaining implementation be called second, or not at all? The solution defined in this iteration provides two mechanisms:

1) Default—The super_process field of the Process defined in iteration four is an ordered list. The order in which the inheritance Processes are defined is the order in which they are called, and all implementations are called in that order. The system described calculates a list of Processes in the hierarchy using a 'left-first, depth-first' mechanism, and then removes all but the last occurrences of the same Process—a mechanism which matches that used in the Python programming language for multiple class inheritance. Consequently, if the Group Process appears first in the inheritance hierarchy, then the initial Process list will be [Scrum Group Process, Group Process, Kernel Process, Scrum Process, Kernel Process]. Then the system removes the first occurrence of the Kernel Process to produce [Scrum Group Process, Group Process, Scrum Process, Kernel Process].

2) Custom An ExecUnit is always (regardless of multiple inheritance) required to invoke a super( ) method in order to cause the invocation of the next URI in the resolved URI Type Hierarchy. When it does so, it may explicitly declare which Process it intends to call super( ) on, and also what order it wants the subsequent calls to be made in. It does this by supplying the Package Dot Path e.g.

super(['kernel.group'])—only use Group Process implementation, the Scrum Process implementation will not be used; or super(['kernel.group', 'kernel.scrum'])—call the Group Process implementation first, followed by the Scrum Process implementation.

Note that this mechanism can also be used to bypass both Group Process and Scrum Process implementations by calling super(['kernel']). Note that the only way the Kernel Process can be excluded is if super( ) is not called at all for one of the Resolved URI Type Hierarchy entries above the Kernel in the list. If super( ) is not called, then processing ends at the ExecUnit which fails to make the super( ) call Consequently, the first mechanism is always used to initially establish the Resolved URI Type Hierarchy, with super( ) calls as described in the second mechanism having the capacity to modify the elements of this list by either re-ordering it or removing elements from it or both. If super( ) is called without arguments, then the default mechanism is used. Note that because the Resolved URI Type Hierarchy may return to the Scrum Group Process as it cycles through the type hierarchy, this style of resolution may occur multiple times during the execution of a Resolved URI Type Hierarchy. This mechanism does not prevent unexpected behaviour, but does give the developer the capability to resolve the issues that arise. The following URI Type Hierarchy demonstrates the approach:

[Feature]/GET: Scrum Group Process lookup
[Knowt]/GET: Scrum Group Process Lookup
[Knowt]/GET: Group Process Lookup, unless the execUnit in the Scrum Group Process calls super( ) with arguments, and does not include the Group Process
[Knowt]/GET: Project Process Lookup, unless the execUnit in the Scrum Group Process calls super( ) with arguments, and does not include the Project Process, or unless the execUnit in the Group Process calls super and explicitly lists the Kernel Process without listing the Scrum Process
[Knowt]/GET: Kernel Process Lookup In most situations, Model classes do not support multiple inheritance. The one exception to this rule is when supporting multiple Process inheritance. The Scope Model declared by the Scrum Group Process in FIG. 26 must inherit both the Group Model from the Group Process and the Project Model from the Scrum Process, making the ScrumGroup (assuming that is the Scope Model declared by the Scrum Group Process) both a Group and a Project. The following definition will be used if the Group Process appears first in the super_process list of inherited Processes, and the Project Process second:

class ScrumGroup(Group, Project):
pass

The declared order must match the order in which the processes are inherited. Since any number of Processes may be inherited, the Scope declared by the inheriting Process will inherit from all of the Scope Models declared by the super Processes.

Two Scope Models may not declare the same field name if they are to be inherited in this way—for example if the Group Model (from the Group Process) defined a field foo and the Project Model (from the Scrum Process) also defined a field foo, then the ScrumGroup Model would not be able to inherit from both Group and Project. For this reason, it is generally discouraged to define additional fields on a Scope Model, or if doing so to take care to choose a field name that is unlikely to conflict—perhaps by using name spacing. For example if Group defined a field kernel_group_foo (using the package of the Group Process to namespace the foo field), and the Project defined a field kernel_scrum_foo then name collision will generally be avoided, especially if this convention is used throughout the system.

An example is required to show how the URI Type hierarchy is constructed in the situation of multiple Model inheritance. The system described calculates a list of Model types using a 'left-first, depth-first' mechanism, and then removes all but the last occurrences of the same Process—a mechanism which matches that used in the Python programming language. If for example Group was declared first in the Process inheritance list, and inherited a hypothetical class Foo which inherited Scope, and Project inherited a hypothetical class Bar, which inherited Scope, then initially this would produce a Process list of [ScrumGroup, Group, Foo, Scope, Context, Knowt, Project, Bar, Scope, Context, Knowt]. Removing all but the last occurrences of repeats produces a type hierarchy of [ScrumGroup, Group, Foo, Project, Bar, Scope, Context, Knowt], assuming ScrumGroup declared Group as the first inherited Model, and Project as the second (and matching the order of the declared super Processes). The following shows how the less complex structure of FIG. 26 would be resolved, assuming the default diamond inheritance solution algorithm defined earlier in this iteration.

[ScrumGroup]/GET: Scrum Group Process lookup
[Group]/GET: Scrum Group Process lookup
[Group]/GET: Group Process lookup
[Project]/GET: Scrum Group Process lookup
[Project]/GET: Scrum Process lookup
[Scope]/GET: Scrum Group Process lookup
[Scope]/GET: Group Process lookup
[Scope]/GET: Project Process lookup
[Scope]/GET: Kernel Process lookup
[Context]/GET: Scrum Group Process lookup
[Context]/GET: Group Process lookup
[Context]/GET: Project Process lookup
[Context]/Knowt/GET: Kernel Process lookup
[Knowt]/GET: Scrum Group Process lookup
[Knowt]/GET: Group Process lookup
[Knowt]/GET: Project Process lookup
[Knowt]/GET: Kernel Process lookup Note that it is always the case that a Process can only be used to lookup a URI if it is aware of the Model types defined in the URI—if it is not aware of the Model types, then it will not be used. For example the following URI Type Hierarchy will not be looked up in the Group Process until it contains types known to the Group Process (the default diamond inheritance resolution is assumed):

[Task]/GET: Scrum Group Process lookup
[Task]/GET: Project Process lookup
[Knowt]/GET: Scrum Group Process lookup
[Knowt]/GET: Group Process lookup
[Knowt]/GET: Project Process lookup
[Knowt]/GET: Kernel Process lookup In practice this mechanism provides the developer with significant flexibility when implementing multiple Process inheritance.

Interpretation

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Although the present invention has been described with particular reference to certain preferred embodiments thereof, variations and modifications of the present invention can be effected within the spirit and scope of the following claims.

I claim:

1. A cloud computing operating system including:
a plurality of code encapsulating data structures, each of the encapsulating data structures configured to define executable code and to define the structure of one or more encapsulating data structures providing a bootstrap mechanism where the code encapsulating data structure strictly defines itself;
wherein said executable code is configured to instantiate the one or more encapsulating data structures and to perform runtime operations on the one or more encapsulating data structures created by said executable code, each code encapsulating data structure of said plurality of code encapsulating data structures form an inheritance hierarchy including a kernel process as a root code encapsulating data structure of the inheritance hierarchy, each code encapsulating data structure of said plurality of code encapsulating data structures is itself one of said one or more encapsulating data structures and each encapsulating data structure is instantiated by the code encapsulating data structure of the encapsulating data structure.

2. The cloud computing operating system as claimed in claim 1 wherein each code encapsulating data structure provides a structured interface, accessible from a network interface module, to the executable code.

3. The cloud computing operating system as claimed in claim 2 wherein the structured interface is a resource oriented API.

4. The cloud computing operating system as claimed in claim 3 wherein the resource oriented API comprises a unique first identifier to an element of the cloud computing operating system, and wherein the first identifier encodes a unique second identifier for an encapsulating data structure and wherein the second identifier encodes a unique third identifier for the code encapsulated data structure that instantiated the encapsulating data structure.

5. The cloud computing operating system as claimed in claim 4 wherein the resource oriented API further comprises an action identifier selected from a group consisting of read, delete, create, and update.

6. The cloud computing operating system as claimed in claim 4 wherein the resource oriented API further comprises a collection identifier including aggregated, indexed, or encapsulated data structures.

7. The cloud computing operating system as claimed in claim 1 wherein the encapsulating data structure is instantiated by the associated code encapsulating data structure by instantiation of each code encapsulating data structure in sequence from the root code encapsulating data structure down an inheritance chain within the inheritance hierarchy of the associated code encapsulating data structure.

8. The cloud computing operating system as claimed in claim 1 wherein all encapsulating data structures access a database through the root code encapsulating data structure of the inheritance hierarchy.

9. The cloud computing operating system as claimed in claim 1 furthering including a plurality of core data structures each configured to define basic attributes that elements of the system contain; and an indexing data structure inherited from one of the core data structures configured to index any number of core data structures or elements inherited from a core data structure;

wherein each encapsulating data structure is inherited from the indexing data structure and configured to encapsulate any number of core data structures or elements inherited from a core data structure and wherein each core data structure is encapsulated within one encapsulating data structure and includes a reference to its encapsulating data structure.

10. The cloud computing operating system as claimed in claim 1 wherein all encapsulating data structures are instantiated by one and only one of a plurality of code encapsulating data structures.

11. The cloud computing operating system as claimed in claim 1 wherein the plurality of code encapsulating data structures are further configured to define user interface elements.

12. A cloud computing apparatus, including:
a plurality of primary memory stores;
a plurality of secondary memory stores;
a plurality of processors, each connected to a primary memory store and to at least some of the plurality of secondary memory stores;
wherein the processors are configured to provide a virtual computing platform, and wherein the virtual computing platform is configured to execute a cloud computing operating system including:
a plurality of code encapsulating data structures, each of the code encapsulating data structures configured to define executable code and to define the structure of one or more encapsulating data structures providing a bootstrap mechanism where the code encapsulating data structure strictly defines itself,
wherein said executable code is configured to instantiate the one or more encapsulating data structures and to perform runtime operations on the one or more encapsulating data structures created by the said executable code, each code encapsulating structure of said plurality of code encapsulating data structures form an inheritance hierarchy including a kernel process as a root code encapsulating data structure of the inheritance hierarchy, each code encapsulating data structure of said plurality of code encapsulating data structures is itself one of said one or more encapsulating data structures and each encapsulating data structure is instantiated by the code encapsulating data structure of the encapsulating data structure.

13. The apparatus of claim 12, wherein the kernel process is always the root of the all process inheritance hierarchies.

* * * * *